United States Patent [19]
Melchione et al.

[11] Patent Number: 5,966,695
[45] Date of Patent: Oct. 12, 1999

[54] SALES AND MARKETING SUPPORT SYSTEM USING A GRAPHICAL QUERY PROSPECT DATABASE

[75] Inventors: Anthony R. Melchione, Bridgewater, N.J.; Rafael Martinez, Fairfield, Conn.; Eric Seifert, East Northport, N.Y.; Martin Hirsch, Teaneck, N.J.

[73] Assignee: Citibank, N.A., New York, N.Y.

[21] Appl. No.: 08/544,102

[22] Filed: Oct. 17, 1995

[51] Int. Cl.[6] .................................................. G06F 17/60
[52] U.S. Cl. .............................................. 705/10; 705/35
[58] Field of Search .................................. 395/201, 606, 395/210, 235; 705/10, 35

[56] References Cited

U.S. PATENT DOCUMENTS

| 5,179,660 | 1/1993 | Devany et al. | 395/200 |
| 5,421,008 | 5/1995 | Banning et al. | 396/600 |

OTHER PUBLICATIONS

Raymond L. Rusnak, "Consumer Credit–Scoring: Are There Lessons for Commercial Lenders?", Journal of Commercial Lending, v 76, n 11, pp. 37–42, Jul. 1994.
Ernest H. Schell, "How to Make Millions with Database Marketing", Datamation, v 38, n 16, pp. 77–79, Aug. 1994.
Katherine Morrall, "Technology Updates Market Research Methods", Bank Marketing, v 26, n 4, pp. 15–20, Apr. 1994.
Brian Hellauer, "Banks Take Aim at Target Marketing", Bank Management, v 69, n 2, pp. A26–A31, Feb. 1993.
Jon Berry, "The Rich and the Worthy: America's Banks are Taking Direct Marketing One Step Further", Adweek's Marketing Week, v 33, n 19, pp. 14–17, May 11, 1992.
Robert B. Slater, "Marketing Magicians Turn Information into Profit", Bankers Monthly, v 108, n 7, pp. 5A–7A, Jul. 1991.
L.L. Pershing, "Package Fine Tunes Marketing Programs", Computers in Banking, v 6, n 9, pp. 21–23, Sep. 1989.
Alan Cane, "Countdown to User–Friendly Banking", Financial Times, pp. 30+, Nov. 1988.
James A. Craig, "A Network Architecture for Retail Bank Networks", Data Communication, v 17, n 11, p. 173, Oct. 1988.
Morrall, K.; Database Marketing Leaves Marketing to the Branches; Bank Marketing; Nov. 1994; pp. 22–30.
Rusnak, R; Consumer Credit Scoring; Journal of Commercial Lending; V76N11; pp. 37–42; Jul. 1994.

*Primary Examiner*—Emanuel Todd Voeltz
*Assistant Examiner*—William N. Hughet
*Attorney, Agent, or Firm*—George T. Marcou; Kilpatrick Stockton LLP

[57] ABSTRACT

An electronic sales and service support system and method for identifying sales targets using a centralized database to improve marketing success. The system includes a central database that receives comprehensive information from a variety of internal and external feeds, and standardizes and households the information in a three-level hierarchy (households, customers, and accounts) for use by a financial institution. The comprehensive information stored on the central database is accessed through micromarketing workstations to generate lists of sales leads for marketing campaigns. A database engine is provided for generating logical access paths for accessing data on the central database to increase speed and efficiency of the central database. The system distributes sales leads electronically to branch networks, where the sales leads are used to target customers for marketing campaigns. The central database is accessed by workstations of a central customer information system for profiling customers, enhancing customer relationships with the financial institution, and electronically tracking sales performance during marketing campaigns.

20 Claims, 24 Drawing Sheets

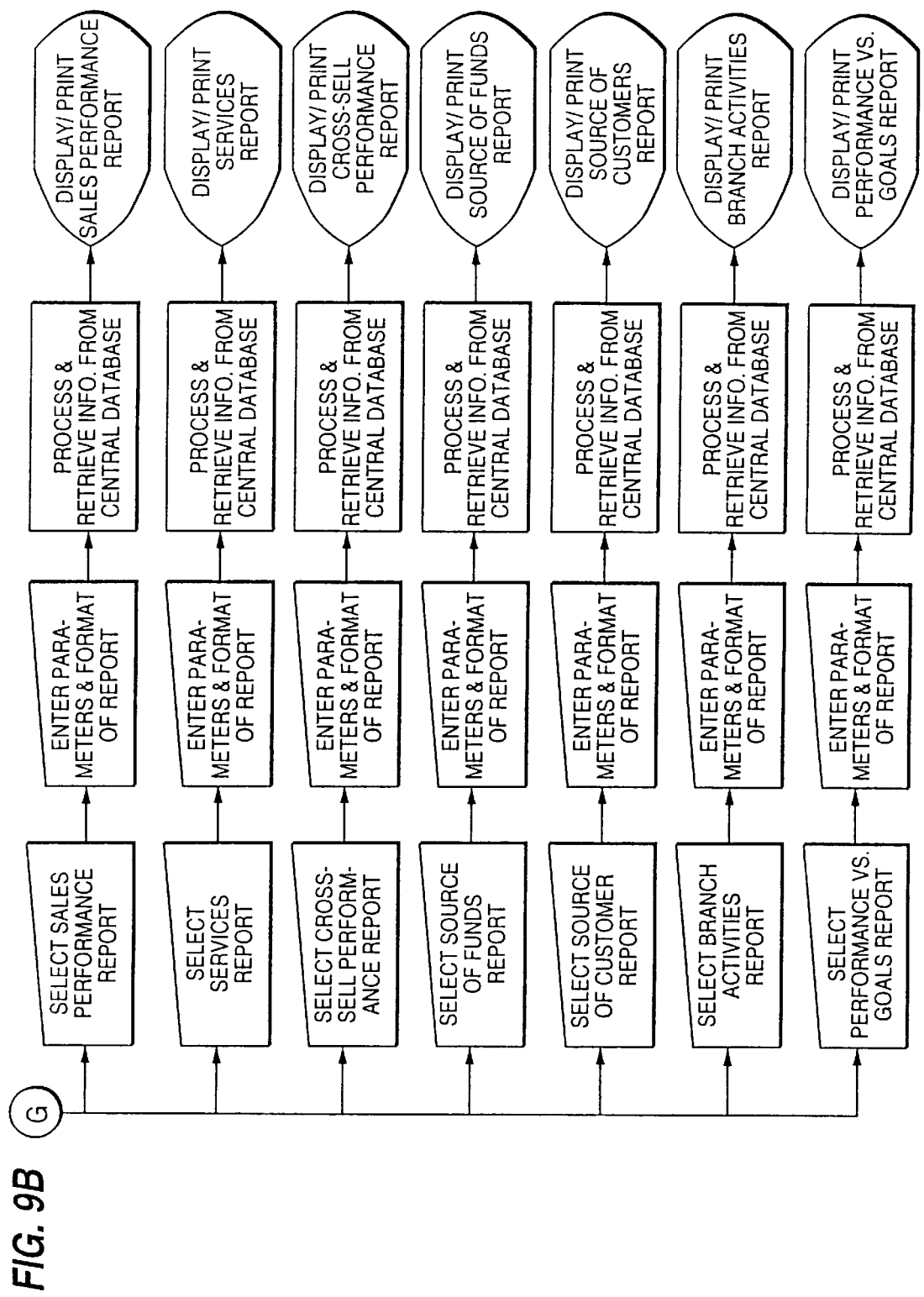

SALES AND MARKETING SUPPORT SYSTEM USING A GRAPHICAL QUERY PROSPECT DATABASE

NOTICE OF COPYRIGHTED MATERIAL IN DISCLOSURE

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

FIELD OF THE INVENTION

The present invention relates generally to a sales and service support system and method, and in particular, to an electronic sales and service support system and method for assisting customer service and identifying sales targets, distributing sales leads, enhancing sales tools, and tracking performance of sales and sales personnel.

BACKGROUND OF THE INVENTION

In response to increasing competition, financial institutions, like other service providers, have begun to adopt sales and service techniques that have been successful in other fields. Marketing financial services poses unique challenges, however. To begin with, most people do not shop for financial services. Instead, something in a customer's life occurs to cause a customer to make a change or be open to a change. There are moments in life when inertia is overcome; either by moving, death, formation of a family, or when a customer becomes angry enough to make a change. For these reasons large unfocused marketing of financial services is usually not effective. Instead, marketing of financial services must be targeted to those inclined to make a change or open other accounts. In the past, accurately identifying customers that are open to change and predicting when these events will occur has been difficult, if not impossible. Thus, there is a need for a better system and method for predicting when customers or potential customers will be open to change.

To anticipate a customer's needs and support targeted marketing, a service provider must know its customer. Knowing one's customers is also important for improved customer service, another proven way of getting and keeping new customers. Since knowing one's customers becomes more difficult when the number of customers increases and the frequency of each customer's contact with a particular employee decreases, the size of a large financial institution's customer base can present an obstacle to some marketing efforts. In the financial community today, a large financial institution may have several million households and customers each with a unique set of accounts. The data available for these households, customers, and accounts is so massive, that it has heretofore not been fully used for marketing campaigns.

In an effort to deal with a large customer database, businesses traditionally maintain customer records. In some cases these records are in the form of simple paper records, but recently electronic records have become common. Originally, separate data storage was used for each electronic record keeping application. Thus, each department in a financial institution, for example, would have a program that created and maintained records needed for its purpose. The problem with this approach is that information must be extensively duplicated. For example, a customer's name and address might appear in separate files in several separate departments.

There are other problems with application specific data storage. Since a customer's information is entered in more than one file, any change in status must be entered into each file, often by different people. Over time the accuracy and uniformity of the data deteriorates. In addition, the use of application specific data storage requires more data entry and more storage space.

The concept of a database, introduced more than twenty years ago, has come a long way toward eliminating these problems. In a database, data is stored in a central location so that there is no duplication of data. Database management programs are used to manage databases. Examples of currently available database management programs include DB2 (for larger databases) and dBase (for personal computers).

Typically, a database management system (DBMS) is used to manage the creation, storage, access, updating, deletion, and use of a database. A typical DBMS creates databases and their structures; provides the means for the control and administration of the data in the database; provides the means for users and application programs to access, enter, modify, and manipulate the data in a database; provides a report generator; provides "ad hoc" query facilities; provides reports to management on who accessed the database and what activity was performed; provides reports to operators on hardware utilization, status of current users, and other monitoring data; and provides automatic backup and recovery routines for the data in databases.

Multiple-user databases present several additional challenges. These include maintaining system performance as the number of users increases, controlling concurrent access of data, maintaining security, and administrating the database.

There are four basic database models: (1) hierarchical, (2) network, (3) relational, and (4) object-oriented. The hierarchical and network models use files for storing data. Data relationships in the hierarchical databases follow hierarchies, or trees, which reflect either a one-to-one or a one-to-many relationship among the record types. Data relationships in network databases follow a many-to-many relationship among the records. The data relationships must be defined at the time that a hierarchical or network database is created. Relational databases use tables for storing data. The data relationships can be dynamically determined by the users and do not have to be defined when the database is created. A relational database uses a database query language for users to access and manipulate data in the database. Query by example and structured query language are two database query languages. Object-oriented databases store data together with procedures in objects.

A relational database is composed of many tables in which data are stored. Tables in a relational database must have unique rows, and each cell or field must contain only one item of information, such as a name, address or identification number. A relational database management system (RDBMS) allows data to be readily created, maintained, manipulated, and retrieved from a relational database.

In most sophisticated databases, data is retrieved by querying the database. Query languages allow users to locate specific records based on the data that they contain. Known query languages include program-specific languages, structured query languages, natural languages, and query by example. When using query languages, the user typically specifies the rules the program follows to select records to be retrieved. These rules are referred to as criteria. Only those records matching the criteria specified are retrieved.

In a relational database, data relationships do not have to be predefined. Users query a relational database and establish data relationships spontaneously by joining common fields. A database query language acts as an interface between users and a relational database management system.

Two basic query styles are used in a relational database: (1) query by example, and (2) structured query language. In query by example, the database management system displays field information and users enter inquiry conditions in the desired fields.

Structured query language (SQL) is the standard database query language used with relational databases. SQL is part of a DBMS, not a separate stand-alone software program. SQL allows users to create and operate sets of related information that are stored in tables. The core of SQL is its flexibility in querying a database.

This flexibility is possible because of the manner in which data are stored in a relational database. Data are stored in tables that have specific properties. These properties include: (1) one or more named columns, (2) the data in each column are of the same type, (3) zero or more rows (zero rows occur when the table is defined but no data are entered yet), (4) every row is unique, (5) a single data value is contained in the intersection of any column and row, and (6) the order of the columns and rows does not matter.

There are two basic schemes for retrieving data from a database: set orientation and record orientation. Each method has advantages and disadvantages.

A set-oriented database allows the user to focus on the characteristics of the data rather than the physical structure of the data. The user works with data in groups, or sets, or tables, rather than as individual tables. DBMSs that use SQL, such as SQL Server, Oracle, and SQL Base, are set-oriented.

Record-oriented databases access data based on the physical structure of data and indexing. A record pointer permits the user to maneuver through a table one record at a time. It is easy to access successive rows or records in a table. However, the developer of the database management system must write the programming code such that it will loop through every record requested, which is a disadvantage. Examples of DBMSs that use a record-oriented approach are dBASE and Clipper.

In SQL, security is maintained by the granting authority. Authority may be granted to an entire database, certain tables, or certain commands. A database administrator must have access to the entire database so that it can be maintained properly, while a user generally needs access to specific tables or parts of tables. For example, a person might have access to a personnel table but not to the salary column in that table.

Attempts to build and use customer databases have a variety of limitations. In a general sense, these limitations fall into two distinct categories: limitations in the sources and quality of data input into the database and limitations on one's ability to search and retrieve data from the database. In some cases these limitations work in opposition to one another. For example, as one improves the size and quality of a databases, searching and retrieving data from the database becomes more difficult.

In recent years, financial institutions, such as banks, have used targeted marketing (especially direct mailing and telemarketing) to market a wide variety of financial products and services to existing and new customers. To assist these efforts, the banks have used traditional databases containing, for example, customer lists and mailing lists. These traditional targeted marketing sources do not, however, take full advantage of the information available to full service financial institutions.

Full service financial institutions typically offer consumers a wide variety of financial products, including traditional deposit, investment, loan, and mortgage accounts, as well as a variety of financial services, including credit cards, brokerage, direct access, business access, checks as cash, telephone bill payment, and safety check. In addition, financial institutions now typically offer access to financial services through a variety of means, including automatic teller machines (ATMs), customer activated terminals (CATs), screen phones, personal computers configured for banking, personal digital assistants, voice response systems, and smart cards, as well as traditional human bank tellers. Information from these diverse sources provides an unusually complete picture of a customer's financial habits and needs. Thus, the ability to store and retrieve this wealth of data in a meaningful way has enormous commercial potential. Despite this commercial potential, there remains a need for a system and method for assembling a comprehensive database from these diverse sources and retrieving information from the central database in a meaningful and practical way.

There are several deficiencies in currently available systems and methods for assembling customer financial data and retrieving information for use in marketing and customer service systems. To begin with, most users (e.g., bank employees) never learn how to use complex query languages. Mastery of the language requires significant training and skill. Instead, developers write custom applications that are used by users having only a limited understanding of the program. Thus, a user's ability to use a database is often limited by the custom applications written by someone else for their use. Consequently, available large scale database systems typically don't have the flexibility to allow the user, the person most familiar with marketing, to use their own knowledge and experience to select criteria retrieving data from the database for targeted marketing. Instead, users must rely on a set of pre-defined queries that may or may not provide the desired results. As a result, the sales campaigns typically only target easily ascertainable groups of new or existing customers, such as all new customers, or all existing customers with certain types of accounts, etc. Since there has been no effective way to quickly generate and distribute lists of sales leads for very specific groups of people that are most likely to subscribe to new financial services being offered, those customers who most likely need or want the additional products a financial institution has to offer are not always the ones targeted by the sales campaigns. This has resulted in less than satisfactory success rates for marketing campaigns.

In addition, those in charge of marketing are often not given access to a customers' entire relationship with the financial institution or complete demographic information about the customer (i.e., the customer's "profile"). Thus, it is difficult for direct mail and telemarketers to address the targeted customers intelligently, with full knowledge of the customer's background and financial situation. Basic information about existing customers is frequently not available, or the response time required to profile an existing customer is too long. These problems tend to create a poor experience for the customer and less than optimum sales performance.

In addition, the sales performance of bank branches, branch managers, and others in charge of the marketing campaigns has not been analyzed and tracked effectively. A complete indication of sales performance has typically only been available after the sales campaigns are complete and after the results of the campaigns are manually collected and analyzed. This typically required a series of paper-based forms and ad hoc systems that generated relatively slow feedback to sales personnel. Thus, there is also a need for a system to provide up-to-date on-line sales summary reports for each of the products and services marketed by the branches, as well as an indication of performance by the individual sales personnel.

In short, there remains a need for an improved integrated system for identifying sales targets, distributing sales leads, enhancing sales tools, and tracking the performance of large sales campaigns and individual salespersons to maximize customer satisfaction, as well as the profit of the financial institution.

SUMMARY OF THE INVENTION

It is thus an object of the present invention to provide an electronic sales and service support system that provides improved identification of sales targets using a centralized database and acts as a tool for improved customer service and relationship building. More specifically, the present invention is directed to a system that allows a bank to predict and take advantage of the rare times when inertia is overcome and a customer is open to changing banks or opening new accounts while at the same time allowing the bank to build or cement a relationship with existing and new customers.

The system of the present invention is also useful for improving customer service and reducing customer attrition by strengthening the banks relationship with the customer. Specifically, studies have shown that as a customer's relationship with a bank broadens, the customer's balances increase, and hence the customer's profitability to the financial institution also increases. Moreover, the more closely a customer is tied to a bank, the more difficult it is to change banks. The present invention provides a tool for establishing a long term and broad relationship with a customer by allowing those in charge of marketing financial services to access and discuss the full range of financial services presently used by the customer, as well as to only target optimum groups of customers for each marketing campaign conducted.

It is a further object of the present invention to provide a system and method for standardizing and householding information from internal and external sources into a centralized database of a financial institution to support marketing activities.

It is a further object of the present invention to provide a system for efficiently assembling and retrieving information from a centralized database containing a high volume of financial and demographic data to support marketing activities.

It is a further object of the present invention to provide a system that quickly generates and distributes lists of sales leads to marketing personnel.

It is a further object of the present invention to provide a system that provides marketing personnel with a dynamic view of a customer's financial and demographic profile during a marketing session.

It is a further object of the present invention to provide an on-line performance tracking system for tracking the performance of sales campaigns and individual salespersons.

Additional objects, advantages and novel features of the invention will be set forth in the following description and will become apparent to those skilled in the art upon reading this description or practicing the invention. The objects and advantages of the invention may be realized and attained by the appended claims.

The present invention meets these objectives by providing a system and method for assembling a comprehensive database from diverse sources and retrieving information from the central database in a meaningful and practical way. The system and method of the present invention are primarily, but not exclusively useful for supporting large-scale marketing activities, especially for large financial institutions.

The system of the present invention preferably includes a central database, a micromarketing center having a plurality of user workstations and a central customer information system ("CCIS") having a plurality of branch workstations. These components are linked together through telecommunication or other means so that both the micromarketing center and the CCIS communicate electronically with the central database.

The central database underlies all of the applications of the present invention, while the CCIS and micromarketing center are used to access the central database information. The central database of the present invention is a comprehensive and enriched database that includes information about all customers and products in the financial institution, including branch products, bank cards, travel and entertainment cards, student loans, investments, insurance and mortgage products.

The central database is designed to insure the accuracy of the information and to make the information easier to use by non-technical staff. Thus, the system includes means for scrubbing and standardizing incoming information, householding, building history, calculating status codes, maintaining tables and calculating strategic flags. Most fields in the central database are preferably updated monthly with information captured at month end.

In the preferred embodiment, the central database stores, in one location, information from various businesses and markets within the financial institution. The central database may include information concerning existing customer financial information, information from outside sources, and demographic information about existing and potential customers. In the preferred embodiment, the central database is housed in a mainframe computer and includes a large repository of financial and demographic data. Information is fed into the database from a variety of sources, including business and credit card feeds from the financial institution for each product and service offered by the institution, and feeds from outside vendors. The outside vendor feeds preferably include all publicly available demographic information, phone numbers, addresses, tax and property records, and so forth.

The data from these sources is stored in a uniform format. For this purpose, a uniform storage or householding algorithm, a name and address standardization process, and a merge process may be used. In addition, the information is preferably maintained in the central database in a three-tier hierarchy so that it can be accessed selectively at household, customer, and account levels. A given household may have one or more customers, and each customer in a household may have a number of different accounts.

Thus, the central database serves as a single central repository for storing all customer related information throughout the business. As described hereinafter, the central database can be used for a wide variety of customer service, financial analysis and marketing purposes.

While a single central repository for storing all customer related information throughout a business offers significant potential, the database is necessarily so large that certain problems arise. For example, the present inventors recognize that a database of this size cannot practically be directly searched. Thus, in accordance with another aspect of the present invention, the system of the present invention includes means for allowing users to dynamically build programs for searching the central database.

The workstations of the micromarketing center of the present invention include means, preferably in the form of software designed to run on a general purpose computer, for generating a graphic user interface ("GUI") that runs on a Windows™ PC or Macintosh™ computer. The means, again preferably software for directing a general purpose computer, provides a local copy of all the tables and structures on the central database that are used by the workstation. This insures that all users have the latest definitions and fields.

In addition, the system includes means for walking users through each step of searching the central database, using pull-down windows, icons, drag-and-drop, and other features that are familiar to users. Moreover, the system includes means for building "proper" SQL queries for each request, and hiding the special codes and syntax required to insure that these queries will run. Finally, the system includes means for downloading reports and files to local printers or storage devices.

The workstations of the micromarketing center also have the capability to, among other things, search the information contained on the central database and generate lists of leads (i.e., sales targets) for marketing campaigns. The micromarketing workstations allow the user to build a query, define or design a report, run the process, i.e., run the query, run the results of the query into a report, and then download or export the report.

The micromarketing workstation also allows the user to generate marketing information or leads and feed the leads directly into the CCIS. A plurality of micromarketing workstations may be used within the micromarketing center to respond to requests from branch managers for lists of leads for selected sales programs (i.e., marketing campaigns for new or existing products or services offered by the financial institution). The micromarketing center works with the branch managers to determine the profile of households, customers, or accounts most likely to purchase the products or services. The micromarketing center then constructs a specific query, runs the query against the central database, and generates a report containing an optimum list of leads to pursue for the marketing campaign.

The workstations at the micromarketing center have the capability to search the central database and extract a list of all households, customers, or accounts that meet specific selection criteria. The list of leads are used to target a direct mailing to the customers or households that meet the specific selection criteria for the sales campaign, or the list of leads is sent directly to the CCIS for telemarketing.

The CCIS of the present invention is a marketing, management and sales tool. It includes several integrated components that are used to view customer information and manage customer contacts and relationships. Relationship management components support a comprehensive sales process. The system provides the following features: a relationship profile that allows appropriate staff members to view household and customer account and balance information both in detail and summary form; account management features that allow bankers to enroll customers in programs such as portfolio management and personal relationship management; a relationship building feature that delivers prioritized call lists on-line and tracks results; a promotional suppression facility that provides information on customers and noncustomers who do not wish to be contacted by telephone and/or by mail; and a contact history feature that displays recent promotional contacts to each customer.

The CCIS performs a number of functions related to the sales campaign. To better understand the CCIS, a brief description of the hierarchy of a financial institution for which the CCIS is used will first be provided. A large financial institution, such as Citibank N.A., is organized into a number of separate community banks in different geographic regions. Each community bank includes a number of separate bank branches. The bank branches, in turn, typically have a branch manager and a number of personal bankers. The CCIS preferably includes workstations located in the bank branches for each of the personal bankers and branch managers, and also in the main office of the community bank for the officers or sales managers of the bank. Each of the various workstations has a different function, depending upon the user's responsibilities and duties within the bank.

The branch managers receive the list of leads generated by the micromarketing center and electronically load the leads into the CCIS workstations for distribution among selected personal bankers within the branch. The branch managers assign the leads to the personal bankers most qualified to handle the leads, or based on the workload and availability of the personal bankers.

The personal bankers receive access to the list of leads on the CCIS workstation, after the list is generated by the micromarketing center and communicated to the CCIS. The personal bankers then conduct sales sessions (e.g., telephone calls) with each of the customers on the list of leads. Before and during the sales sessions, the personal bankers use the CCIS to view a complete profile (in detail or in summary form) of the customer's relationship with the bank and any other demographic information about the customer contained on the central database. This allows the personal banker to speak intelligently with the customer during the sales session and thereby increase the success rate of the marketing campaign.

The branch managers and bank officers, in turn, use the CCIS as a tracking and reporting management tool to automatically capture daily sales information. The branch managers and bank officers access the detailed sales transactions for each personal banker using the CCIS, and view the sales results for the various campaigns to track the performance and make adjustments in the campaigns as necessary. The branch managers and bank officers also use the CCIS to reassign leads among personal bankers and/or branches to optimize the use of marketing resources.

BRIEF DESCRIPTION OF THE DRAWINGS

The present invention will become more clearly appreciated as the disclosure of the present invention is made with reference to the accompanying drawings wherein:

FIGS. 9A–9B are flow charts showing process steps for a sales tracking and reporting function using the central customer information system.

DETAILED DESCRIPTION OF THE PREFERRED EMBODIMENT

Reference will now be made in detail to a preferred embodiment of the invention, an example of which is illustrated in the accompanying drawings.

Figure 1:
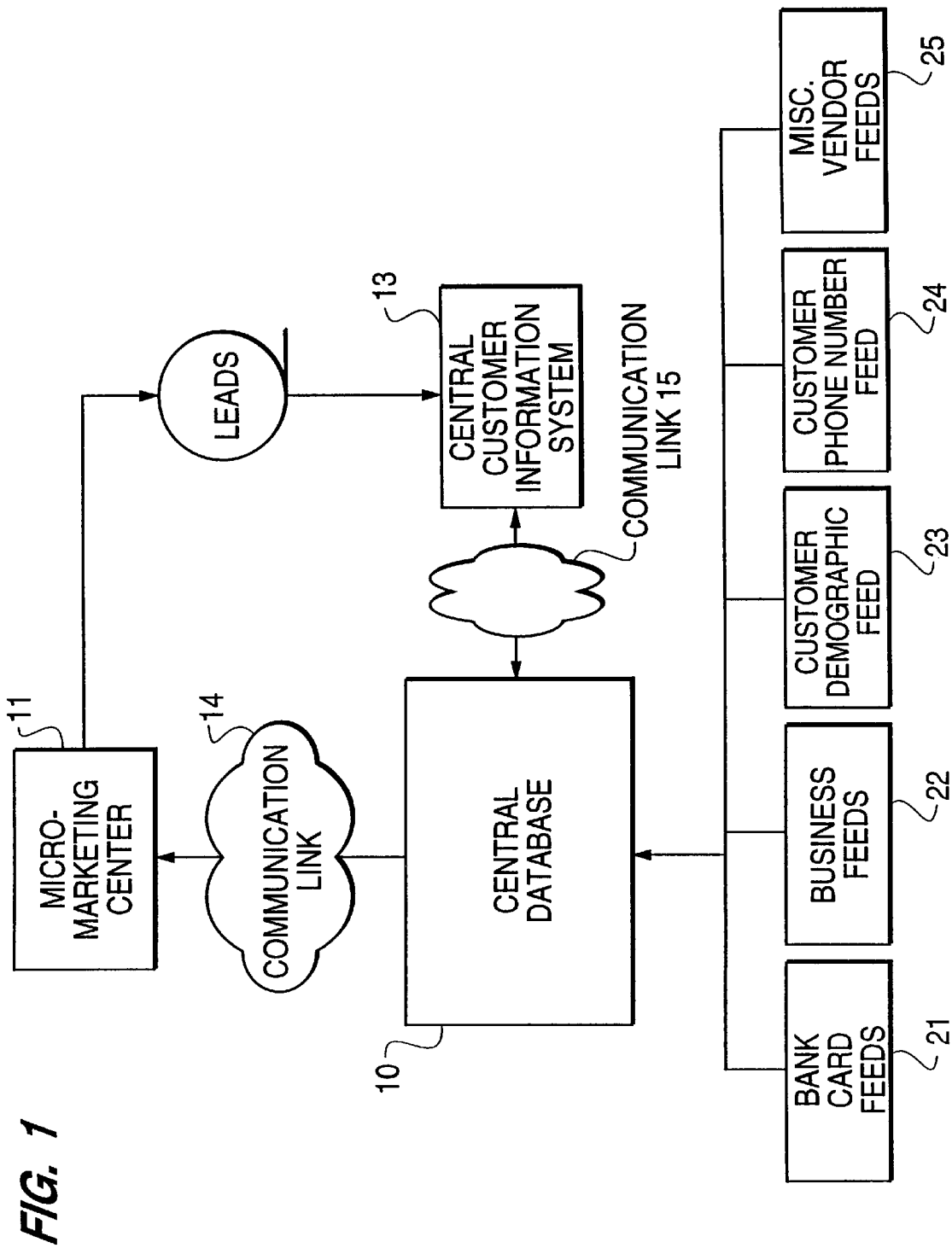
FIG. 1 is a high level view of the sales and service support system of the present invention.
Figure 2:
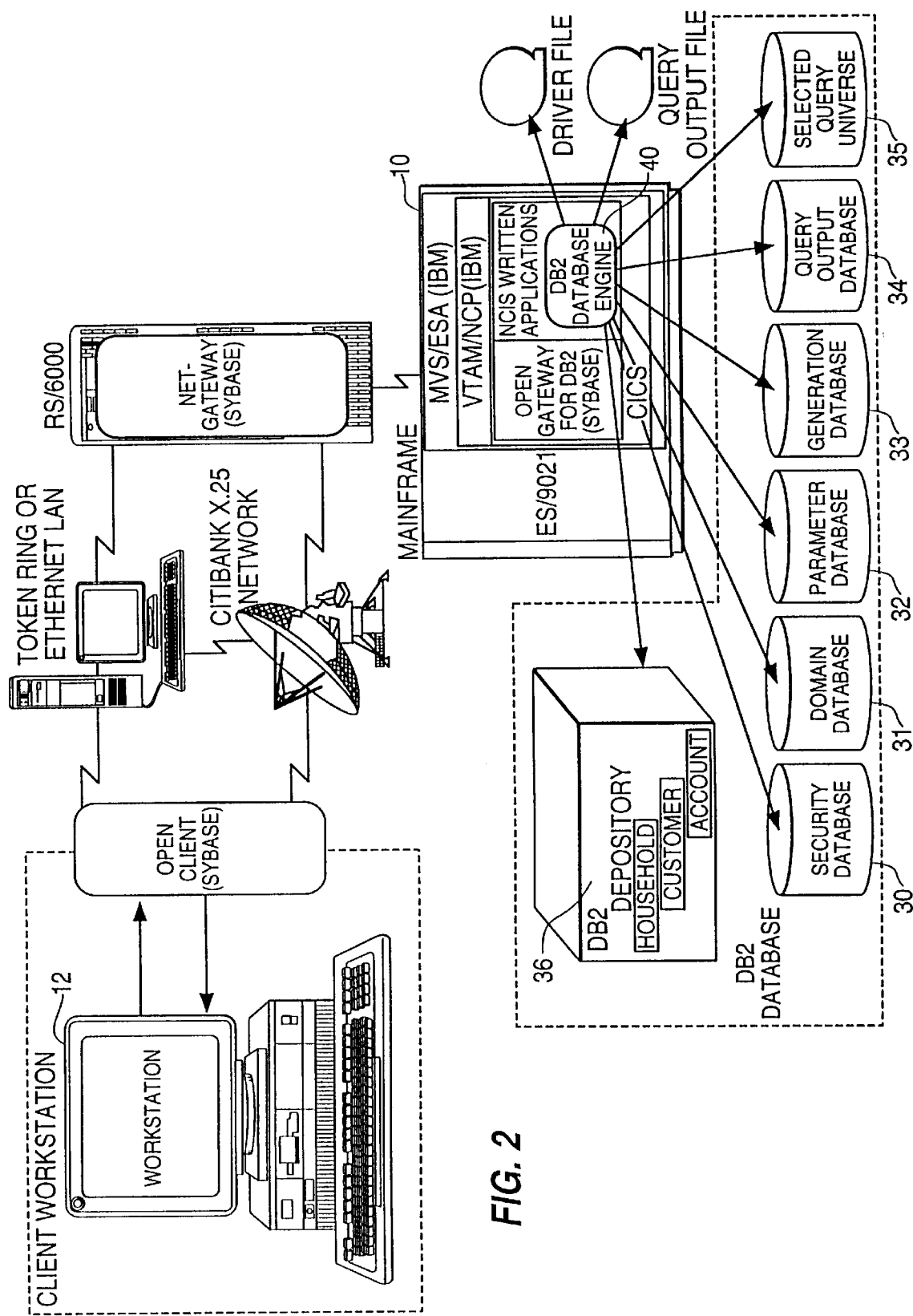
FIG. 2 is a schematic view showing the components of the central database.

FIGS. 1 and 2 provide an overview of the system of the present invention. The system includes a central database 10, a micromarketing center 11 with a plurality of workstations 12, and a central customer information system ("CCIS") 13. These components are linked together through telecommunication links 14, 15 (e.g., X.25 network) or other means so that both the micromarketing center 11 and the CCIS 13 communicate electronically with the central database 10.

More particularly, the workstations 12 of the micromarketing center 11 include software, such as Omnis 7, that communicates through a SYBASE gateway and a token ring network with the mainframe computer of the central database 10. In this manner, the system has the capability to be accessed from any remote location, provided the user has authorization to pull the requested queries or reports.

As used in the following description, a "lead" is a customer or non-customer specifically targeted for a sales effort based upon a probable need. The lead can be self-identified, part of an ongoing effort, or part of a short term campaign. A "campaign" is a group of targeted sales leads (customer or non-customer) that are managed through the CCIS 13 to introduce or expand new or existing products and services offered by the financial institution.

A "session" as used herein is a meeting, typically by telephone, between a personal banker or other sales representative and a customer that results in the sale of products or results in services being delivered to the customer and/or other members of the customer's household. Sessions are used to meet with the customer, to discuss the customer's management needs, and to offer products and services to satisfy the customer's needs.

The term "product" typically refers to such items as deposits, investments, loans, or mortgage accounts of a financial institution. The term "service" typically refers to things offered by the institution other than deposits, investments, or credit accounts, such as, credit cards, brokerage, direct access, checks as cash, phone bill payment, safety checks, and so forth. The terms "product" and "service" will be used interchangeably throughout this application.

The various components of the present invention are described in detail below.

Central Database

The central database 10 underlies all of the applications of the present invention. The central database 10 is a comprehensive and enriched database that includes information about all customers and products in the financial institution, including branch products, bank cards, travel and entertainment cards, student loans, investments, insurance and mortgage products. The central database 10 captures daily and monthly feeds from processing systems across the institution and builds a very large "data warehouse" to make it easy to access this information. The central database 10 receives information from a plurality of internal files of the financial institution, as well as external demographic and other publicly available information used to enhance the database.

The central database 10 is designed to insure the accuracy of the information and to make the information easier to use by non-technical staff. Thus, the system includes means for scrubbing and standardizing incoming information, householding, building history, calculating status codes, maintaining tables and calculating strategic flags.

The purpose of the central database 10 is to store, in one location, information from various businesses and departments within the financial institution. In the case of a bank, for example, the fact that a particular customer owns a checking account, has a student loan and has been solicited by bank cards a couple of times or for various products can be stored in the central database 10.

The central database 10 may include information concerning existing customer financial information, information from outside sources and demographic information about existing and potential customers. In the preferred embodiment, the central database 10 is housed in a mainframe computer and includes a large repository of financial and demographic data. Information is fed into the database from a variety of source feeds 21–25, including business and credit card feeds 21 and 22 from within the financial institution for each product and service offered by the institution, customer demographic feeds 23, customer phone number feeds 24, and feeds 25 from a variety of other outside vendors.

The data from the various feeds 21–25 is stored in the central database 10 in a uniform format. For this purpose, a uniform storage or householding algorithm, a name and address standardization process, and a merge process is preferably used. In this way, the central database serves as a single central repository for storing all customer-related information available to the financial institution. The householding algorithm ties different accounts together into a single unit considered to be one household, based on information such as the same last name and same address, or same name or social security number on different accounts, and so forth that indicate the same person or persons living in the same household. The householding process provides a meaningful way of getting to the data on the central database 10 and extracting it logically.

Figure 3:
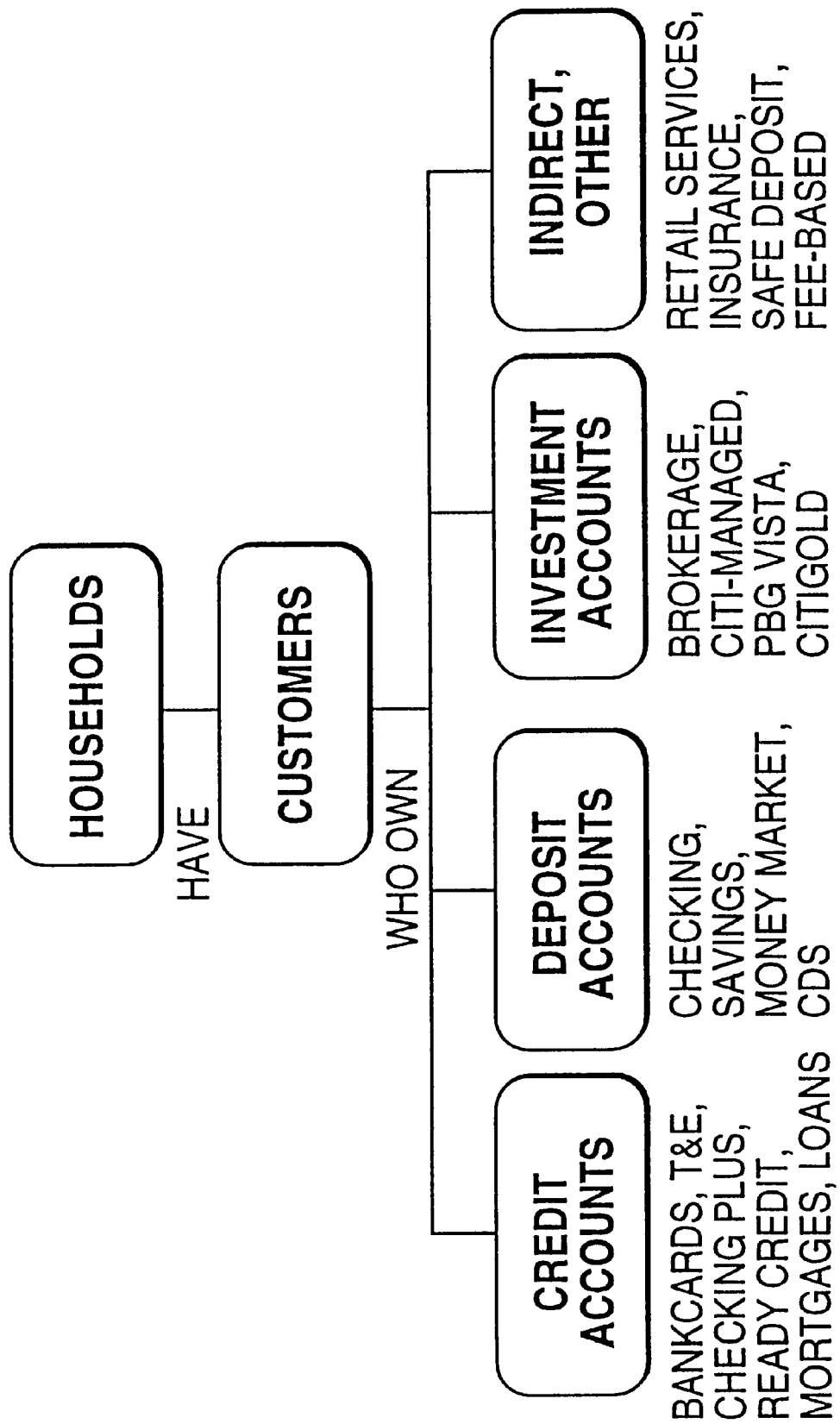
FIG. 3 is a block diagram illustrating the three basic levels that information is stored (householded) in the central database.

As indicated in FIG. 3, the information is preferably maintained in the central database in a three-tier hierarchy—households, customers, and accounts. A given household may have one or more customers, and each customer in a household may have a number of different accounts. As discussed in detail below in connection with the database engine, the three tier hierarchy provides "keys" at each of the household, customer, and account levels that satisfy user criteria for queries, views, and reports. The central database 10 can be used for a wide variety of customer service, financial analysis and marketing purposes.

The central database 10 includes several database components to support the operations of the present invention, including a security database 30, a domain database 31, a parameter database 32, a generation database 33, a query output database 34, a selected query universe 35, and a household-customer-account repository 36. These components of the central database 10 are interfaced with each other and with the outside communication feeds by a database engine 40.

The security database 30 stores a list of entitlements, as well as user IDs and passwords for each user of the system. Since financial institutions work with highly confidential and valuable information, it is necessary to restrict the access of each user to only those areas of the database necessary to perform his or her job. For example, when a user logs onto the system from one of the remote workstations (as described below) the database will perform a security check to ensure that the user provides the proper user ID and password, and then restricts the user's access to the database according to the entitlements assigned to that user.

For each user's profile, the security database 30 maintains information about the user's workstation, such as the amount of RAM contained in the workstation and the size of the hard drive. The security database 30 also determines whether the user can access certain accounts, such as sold mortgage accounts and private bank accounts, and whether the user is given access to sensitive name and address information.

The domain database 31 stores the definitions and descriptions of all the data elements contained in the central database 10. In the preferred embodiment, as an initial step to searching the database 10 from the micromarketing center, the system of the present invention downloads the elements and data descriptions contained in the domain database 31 to the user's workstation 12. This information is preferably in the form of a data glossary or index for the central database 10. This data glossary or index includes a description of all elements contained in the central database 10, as well as all of the values for the elements. Thus, for example, if the user wants to look at account status, the workstation 12 of the present invention can access from the domain data base 31 the available values for the account status. In this example, the system of the present invention might show the user that a particular value is an indication of whether an account is "opened" or "closed."

The system of the present invention is dynamic enough so that, upon receiving a request from a user for a particular element, the system will check what descriptions exist for that element. If no descriptions exist, the user will have to data enter this element. The data glossary or index is preferably maintained locally on the user's workstation after the initial downloading from the domain database 31 to enhance system performance.

The Query output database 35 contains the actual results of the searches performed against the central database 10. Every report and key file created during a search goes to a DB2 output table in the output database 35. Once the report is in the DB2 output table in the output database 35, it can be dynamically formatted and accessed as desired.

Logical Database Engine Components

The database engine 40 has two logical components. The first one extracts the keys that satisfy the user criteria. These keys are preferably at the household, customer or account levels (HH_NO, HH_NO+CS_CUST_NO, or HH_PO+ACCOUNT IDENTIFIER, respectively).

The second component (the data extractor component), picks up all the data items that the user wants. Both components can work together in a single job, or the user can save the keys for further processing at another time. Furthermore, certain types of queries need not extract keys at all, but can obtain the data directly without intermediate key extraction steps.

If the user requests and saves the keys, the user can then use the saved keys to pick up different set of fields (using the data extractor component of the database engine) at different times. Alternatively, the user can further reduce the set of keys (and save the new set, instead of, or in addition to the old set of keys) by applying additional criteria to the old set.

The two components are associated with two different parts of the query specification conversation: 1) in one the user specifies the criteria that identifies the universe sought; and 2) in the other the user specifies the attributes the user wants from the universe selected. Both parts can be performed in one sitting, or separately. When performing part 2 the user can refer to a key universe previously created. Alternatively, new key sets may be derived from previously created key sets by applying additional criteria.

The keys are saved using DB2 tables, with the user ID as AUTHID. This means that a key table can only be accessed by the user for which it was created. A job control/scheduler subsystem preferably keeps track of which set of keys belongs to which user/query/execution. The job control system will delete on a periodic basis saved keys that have not been used in a period of time and are not to be reused on a periodic basis (for example, for the purpose of producing periodic program tracking reports).

Even if the user does not want the keys saved, the database engine may temporarily save an intermediate set of keys (on the way to getting the final result) if doing so enhances performance. Some possible scenarios for this performance situation are described below.

The data extractor component of the database engine 40, which can execute alone or with the first key extract component, has the function of pulling the desired data from the database once the keys have been extracted. If it executes with the first component, the keys may not even have to be saved on a table but passed through host program variables from previous SQL statements.

Normally the user wants the full household (or customer) set of account relationships. Account data is stored separately in the central database in tables that will be referred to hereinafter as Asset/Liability (ALA) and Bankcard (BC)

tables. Normally users looking for relationship information would like to see accounts for the same household follow each other. In order to avoid having to sort to obtain the order desired (a UNION ALL will access the ALA table followed by the BC table) the program will open a cursor on each of the account tables and utilize merge logic to provide the output in household (key) order. This arrangement has the advantage that I/O on the ALA and BC tables is done in parallel, while the keys coming from the key table are only read once because they are kept in memory by DB2. Also, since data is read in clustering key order, dynamic sequential pre-fetch is likely to be turned on in all the tables. The result is much faster execution.

A typical SQL SELECT statement used by the present invention will look like:

SELECT output columns
FROM ALA table, KEYS table
WHERE
HH_NO in ALA=HH_NO in KEYS table
for the ALA set of accounts, and
SELECT output columns
FROM BC table, KEYS table
WHERE
HH_NO in BCO=HH_NO in KEYS table
for the bankcard set of accounts.

If a user wants data from a household and/or customer table, a join to these other tables will be done in each SELECT statement. These joins will be very fast because DB2 will be dynamically doing sequential prefetch on each table if the household keys are in household number order. Also, since both SELECTS are being executed in parallel, performance will benefit because DB2 will often find the household (and/or customer) row in memory. With these facilities, data access is remarkably fast with a very large DB2 database.

If the keys are not in a saved table, but are coming from another SELECT statement within the program, the above SELECT statements need only be modified by eliminating the key table join and substituting a key value stored in a host variable in the WHERE clause statement. DB2 will still do dynamic sequential prefetch on all tables to get the data.

The generated program will include simple merge logic to write the output in key sequence. To obtain the desired access path, an ORDER BY command may be needed in the SELECT statements, assuming the Key table is accessed first and a Nested Loop join method is used. Otherwise, the Key table is fetched separately and a host variable is used instead of the join condition.

The SELECT statement above assumes that a full relationship set of accounts for each household will be extracted each time. However, the user may request data from only one of the three tables, and/or add additional criteria limiting the output more. Applying the additional criteria can be thought of as a role of the other component of the database engine.

Extracting keys first may not be necessary in certain situations. For example, relationship queries having criteria solely at the household or customer level, possibly using pre-summarized columns, can be performed without first extracting keys. These queries, however, may require a post extract sort, since accounts for the same household are not together in the output (due to the use of UNION ALL). Non-relationship queries, single table queries and regular joins, also do not require saving keys.

The word "path" is used to describe a particular set of criteria against a particular set of data. In the present invention, there is an account path, a household path, an enrollment path and, implicitly, a program tracking path and a special superhousehold path.

The advantages of the path concept are two: first it organizes query specification in a manner that is both intuitive and relationally consistent. In using an account path, for example, the user is specifying that households must (or must not) contain accounts that have certain characteristics. The second advantage is that the path specification has a fairly direct correspondence with SQL, making it easier to transform into SQL statements.

While the path concept is used to describe certain details about the database engine 40, the path concept need not be explicit in the user conversation. The workstations 12 of the micromarketing center 11 and the CCIS 13 prompt the user by asking the right questions to generate parameters that can then be used to analyze the query in terms of paths.

An account path allows the user to select households (or other keys) that fit a single account level criteria. That is, an account path provides all households that contain accounts of a given product where, optionally, the product possesses certain other attributes. The SELECT statement for an account path may look like:

SELECT DISTINCT HH_NO
FROM ALA
WHERE
(PRODUCT_CODE=?) AND ( . . . other account specific conditions)

Product codes can be Ptype, Stype or Source Product Code. Specifying these values (the conversation) may be somewhat complex, since unique values or codes may depend on a composite of columns. If the user wants to specify the product code at the service type level, the query can be answered in one step by using the flags and summary variables at the household level.

However, even in this case the user may want to specify other characteristics that the product must have (open date, individual account balance, etc.) that are only available at the account level. This query will pick all households that have accounts with the appropriate product and related characteristics. The criteria within brackets applies to one product. The DISTINCT clause can be used in a query to eliminate duplicate households that will occur if a household has more than one account of the requested type.

The user may want households that have EITHER one product with certain characteristics OR another product with certain other characteristics. Or the user may want households that at the same time (AND) contain another type of product, or do not (NOT) contain accounts of another type.

In general, this is a problem in set theory. It can be thought of as each individual account path resulting in a SELECT statement that gets executed and obtains a set of keys at the household level (set HH1, set HH2 . . . set HHn) or customer level. Then the final desired set of households is the result of the following logical statement:

HH1 AND HH2 OR HH3 NOT HH4 . . .

where parenthesis may be used to clarify the order of the operations. All of the above have equivalent in SQL. For example, the following SQL statement:

SELECT DISTINCT HH_NO
FROM ALA
WHERE
(PRODUCT_CODE=?) AND
( . . . other account specific conditions joined by and/or)
AND HH_NO IN (SELECT HH_NO FROM HH2_TABLE)
is similar to ANDing the first two sets, where the first SELECT statement represents the HH1 set, and the inner subselect uses the second set of keys (HH2) that was previously selected and saved. If both sets HH1 and HH2 are represented by keys stored in tables, then the AND is obtained by a simple join between the two.

The above solution to the problem may not be optimal because it usually requires multiple passes to the database. In many cases only one pass is required. Different cases are discussed below.

If the user wants households that have one type of account or another, the above approach will require two separate account path specifications (conversations), producing two SELECT statements. Each select statement would be executed and two sets of households obtained. Then these two sets will be ORed.

However, the same purpose can easily be accomplished in one SELECT statement by adding another bracket within the parenthesis:

SELECT DISTINCT HH_NO
FROM ALA
WHERE
(PRODUCT_CODE=? (first product code)
AND ( . . . other account specific conditions joined by and/or)
OR
PRODUCT CODE=? (second product code)
AND ( . . . other account specific conditions joined by and/or))

The statement inside the brackets specifies all the characteristics for a particular account that the household must have. The OR operator allows the user to specify all the characteristics of another type of account that the household may have. For example, this second type of account may have a different balance, etc. The household will be selected by the query if it has at least one account with either set of characteristics. OR logic can be implemented in one pass of the data, because the logic can be applied one row at a time.

Another way to specify OR logic is to use the IN predicate, as in the following example:

PRODUCT_CODE IN (list of products)

However, by using this statement, any other conditions specified in the WHERE clause will be applicable to each of the PRODUCT_CODES selected (for example, AND BALANCE>4000 will apply to each of the products individually). The workstation software ensures that the conversation will differentiate between the two OR logic cases to avoid mistakes.

If a user is looking for households that have two (or more) types of accounts simultaneously, then the query has two (or more) Account paths but the resulting select statement is more complex. There are alternative ways to construct the select statement for two or more Account paths. First is a correlated subquery as follows:

SELECT DISTINCT HH_NO
FROM ALA A
WHERE
({A.PRODUCT-CD=? AND (A. . . . )})
AND HH_NO IN
(SELECT HH_NO
FROM ALA B
WHERE
A.HH_NO=B.HH_NO
AND
({B.PRODUCT-CD=? AND (B. . . . )})

The list of households in the subselect can be saved and brought back as a key table. This key table can be joined to the higher level select (meaning the household must satisfy both criteria) or may be related to the outer SELECT in the same way (AND HH_NO IN . . . ).

An alternative and more efficient way of doing the same is to do a join between the two original tables as follows:

SELECT DISTINCT HH_NO
FROM ALA A, ALA B
WHERE
A.HH_NO=B.HH_NO
AND
({A.PRODUCT_CD=? AND (A. . . . )}
AND
{B.PRODUCT_CD=? AND (B. . . . )})

The use of a correlated subquery avoids two passes to the data. However, the same is true of the join approach, since the data for other rows within the same household will likely be in memory. In either case, benchmarks with the database manager should be included to validate performance.

Alternatively, a query can be broken down, and intermediate results of household numbers stored. Indexes for product codes are preferably used to increase the speed of searches. The extracted distinct HH_NO can be saved and reused later, or passed directly to the second data extractor component.

The NOT path always requires two passes to the data. If the user wants households that do not have a certain type of account, the database engine 40 first looks for the households that have that type. Then the system finds the complement of these households. The following select statement provides an example of a NOT path:

SELECT DISTINCT HH_NO
FROM ALA A
WHERE
HH_NO NOT IN
(SELECT HH-NO
FROM ALA B
WHERE
({B.PRODUCT_CD=? AND (B. . . . )})

The use of the NOT path is not as simple as it seems for two reasons. First, the unconstrained complement may not be what the user is looking for. Second, if submitted this way the query may perform very badly.

In general, when on an account path the user will specify not only product related conditions using variables that are totally dependent on the account/product, such as financial (account balance, amount of transfers, etc.) and descriptive (open date, marketing status) variables, but also other conditions using variables that are indirectly related to the account, such as organization level, geographic location, and so forth. Relationally, these other variables are part of foreign keys, and their presence in the account row establishes the relationship between the Account entity and the ORG or Geographic entities.

Most probably the logical intention of the user will be that the search of the households be limited to this organization level, geographic location, etc. In that case, the above SELECT statement will not accomplish the user's intent.

The following expanded SELECT statement will make this point clear:

```
SELECT DISTINCT HH_NO
FROM ALA A
WHERE
HH_NO NOT IN
(SELECT HH_NO FROM ALA B
WHERE
((B.ORG AND B.GEOGRAPHIC, etc. conditions)
AND
({B.PRODUCT_CD=? AND (B.other_product_
    conditions . . . )})
```

In this formulation, the subselect has the ORG/GEOGRAPHIC conditions, so the product condition searches within this subset of accounts (households). However, when the complement is executed, there is no such limitation and the database will search among all the households including ones that do not belong to the organization and geography. The resulting set of households will in general be much larger and not be what the user expects.

To correct this problem, the ORG and GEOGRAPHIC conditions must be repeated in the outer select. A more proper formulation of the SELECT statement for the NOT path is presented below:

```
SELECT DISTINCT HH_NO
FROM ALA A
WHERE
(A.ORG AND A.GEOGRAPHIC, etc. conditions)
AND
HH_NO NOT IN
(SELECT HH_NO
FROM ALA B
WHERE
((B.ORG AND B.GEOGRAPHIC, etc. conditions)
AND
({B.PRODUCT_CD=? AND (B.other_product_
    conditions . . . )})
```

However, since many households will have accounts with different ORG and GEOGRAPHIC values, a question arises as to whether the system should allow a household to be chosen that has a minor account that fits the ORG/GEOGRAPHIC conditions and at the same time has no account of the type NOT desired. This is referred to as the Prime vs. Actual problem; should the system use the ORG/GEOGRAPHIC of the primary account (stored at the household and customer tables), or of any account. If the answer is the primary, then the outer Select looks at the household table.

This query must be benchmarked in the database manager. To reduce the time for the query when the households in the NOT IN list are too many, there are two options. First, the IN list can be stored and re-read in order, by a process that then not-matches them with the rest of the HH_NO in the database using an index. Second, the household keys can be stored in a table with a household index. With either of these options, the database will perform the NOT IN logic very efficiently.

The NOT ACCOUNT PATH can easily be added to the previous ACCOUNT PATH using the following SELECT statement:

```
SELECT DISTINCT HH_NO
FROM ALA A
WHERE
(A.ORG AND A.GEOGRAPHIC, etc. conditions)
AND
({A.PRODUCT_CD=? AND (A.other_product_
    conditions . . . )}
AND
HH_NO NOT IN
(SELECT HH_NO
FROM ALA B
WHERE
(B.ORG AND B.GEOGRAPHIC, etc. conditions)
AND
({B.PRODUCT_CD=? AND (B.other_product-
    conditions . . . )})
```

The household path, the enrollment path, and the program tracking and superhousehold paths and their combination with the account path will now be discussed.

The household path is used to specify conditions that apply to the full household. These conditions can be specified directly or indirectly. Direct specification is done by using columns of the household table, like in the following Select example:

```
SELECT HH_NO
FROM HHD A
WHERE
(A.ORG AND A.GEOGRAPHIC conditions)
AND
A.HH_CHK_TOT_BAL>10000
```

The last condition is an example of the use of a presummarized variable.

Whenever the household path consists of conditions using existing household variables, the household path conditions can be combined with any account path conditions by means of a join, and executed in one pass of the data. The following SELECT statement provides an example of this:

```
SELECT HH_NO
FROM HHD A, ALA B
WHERE
A.HH_NO=B.HH_NO
AND
(A.ORG AND A.GEOGRAPHIC conditions)
AND
A.HH_CHK_TOT_BAL>10000
AND
({B.PRODUCT_CD=? AND (B.other-product-
    conditions . . . })
```

However, sometimes household level conditions can not be specified using a stored household variable. This is true of summary variables (totals, averages, etc.) requested at a lower level of product detail than the Service Type level that is summarized in the household table. This type of household path must be executed in a separate SELECT statement using GROUP BY and HAVING clauses. A typical example is:

```
SELECT HH_NO
FROM ALA A
WHERE
(A.ORG AND A.GEOGRAPHIC conditions)
AND
({A.PRODUCT_CD=? AND (A.other_product_
    conditions . . . })
GROUP BY HH_NO
```

HAVING
(SUM(ACCT_BALANCE)>5000
AND
(SUM(ACCT_CR_LIM)>10000
AND
COUNT(*)>3)

The resulting set of households can then be saved (permanently or temporarily) and then combined (AND/OR/NOT IN) with other sets of households in the same or other queries.

Performance of these queries will be particularly fast if indexes are used for balance, credit limit, ORG, Geographic variables, etc., and include the household number in them. Since the summaries are built out of account data, the conversation may combine the specification of this request, with the specification of account path. The database engine can be selectively set so that the ORG and Geographic variables refer to actual and/or prime.

The customer path is very similar to the household path. The main difference lies in that with this path the combination of household and customer values is saved as a key.

Definition Tables

Figure 4A:
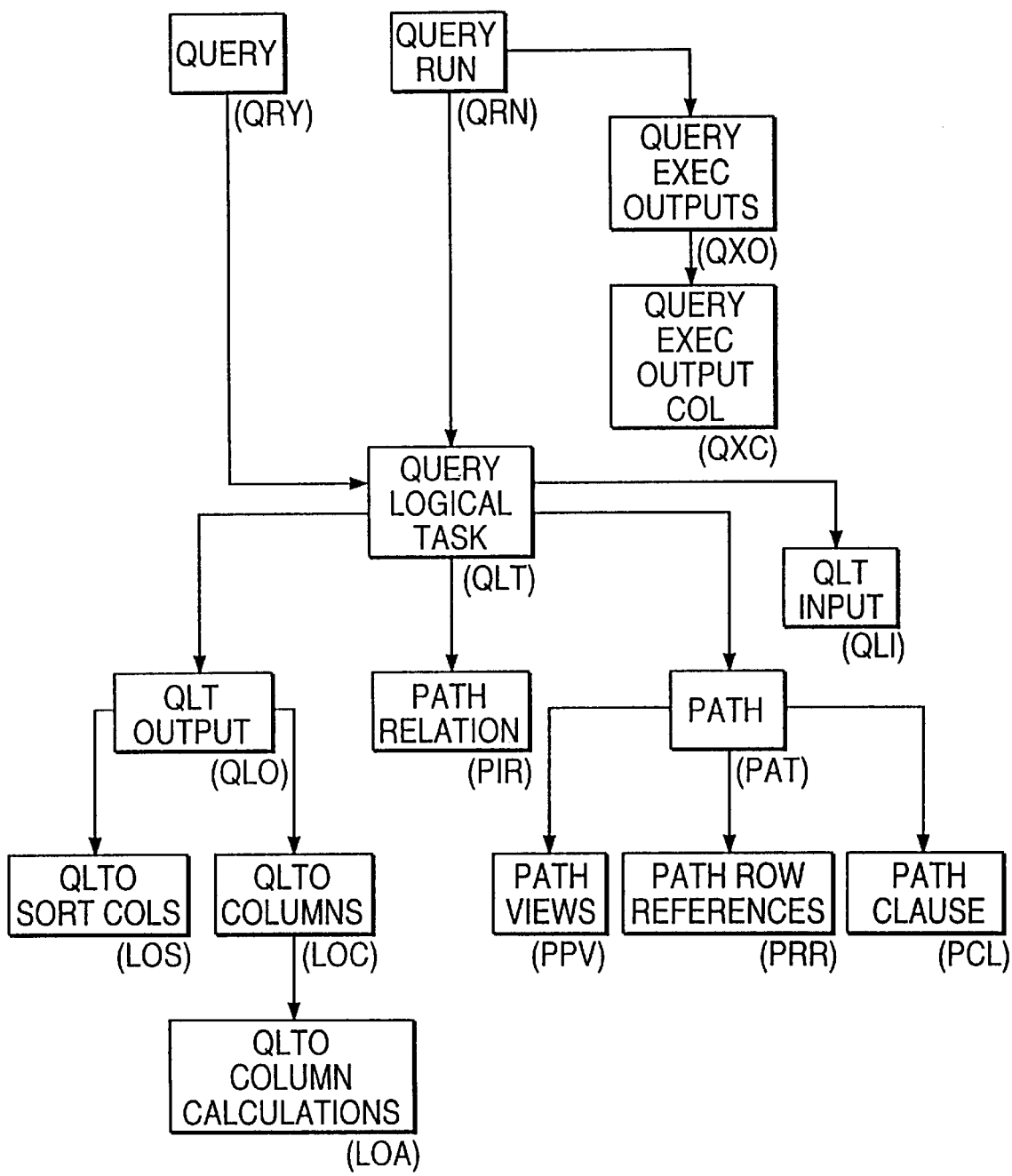
FIGS. 4A–4D are block diagrams illustrating the various tables that make up the database engine for accessing the central database.
Figure 4B:
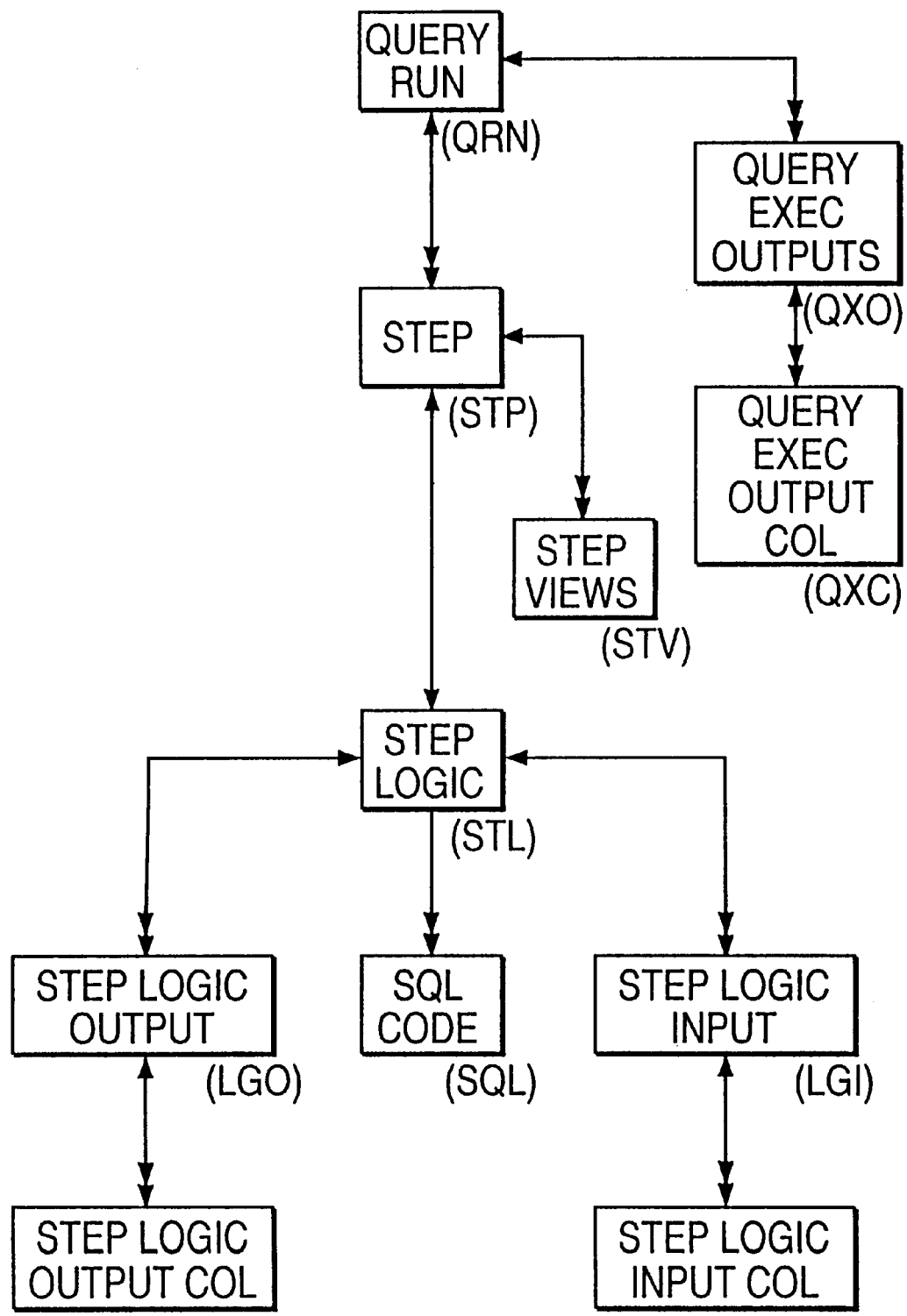
Figure 4C:
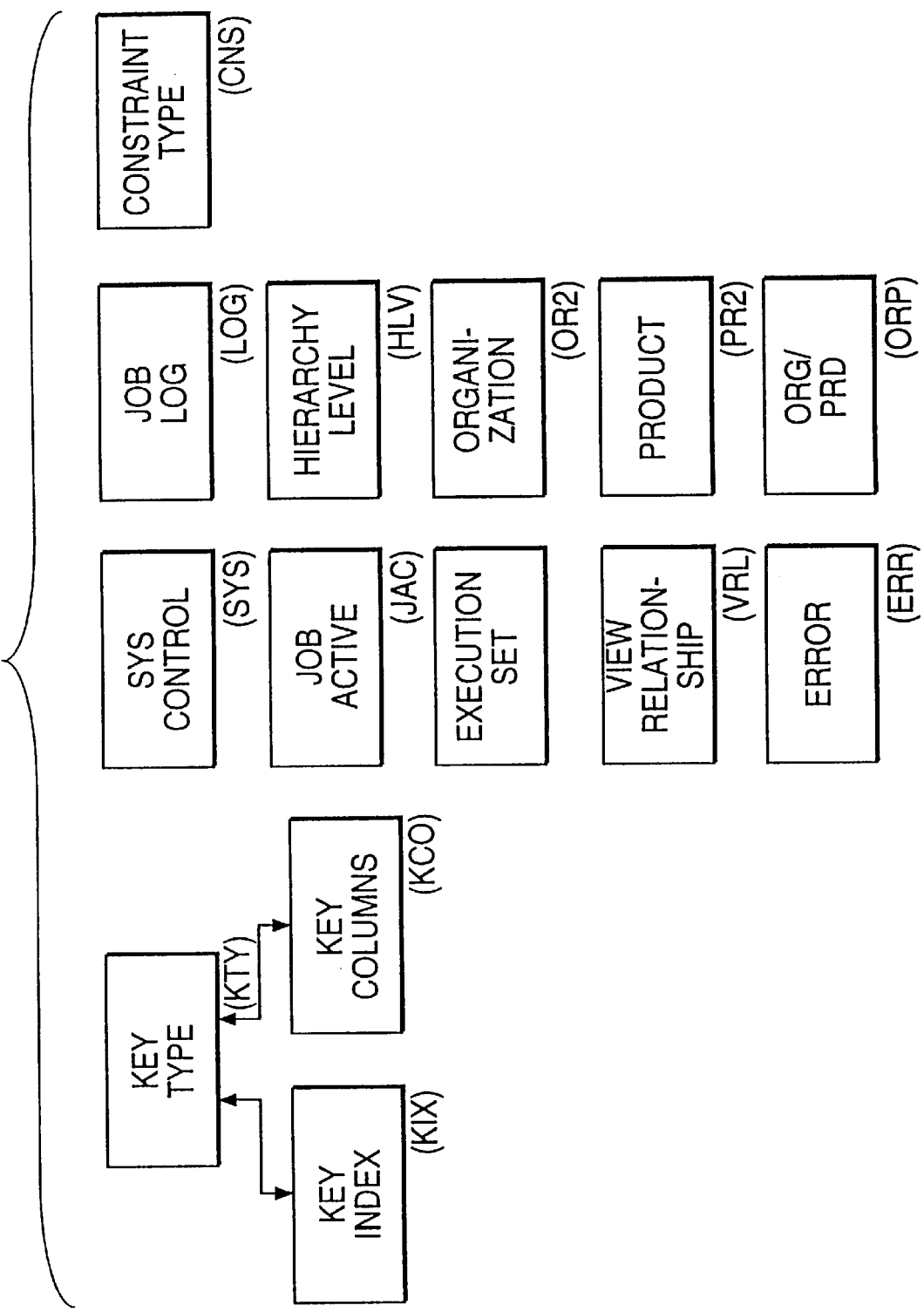
Figure 4D:
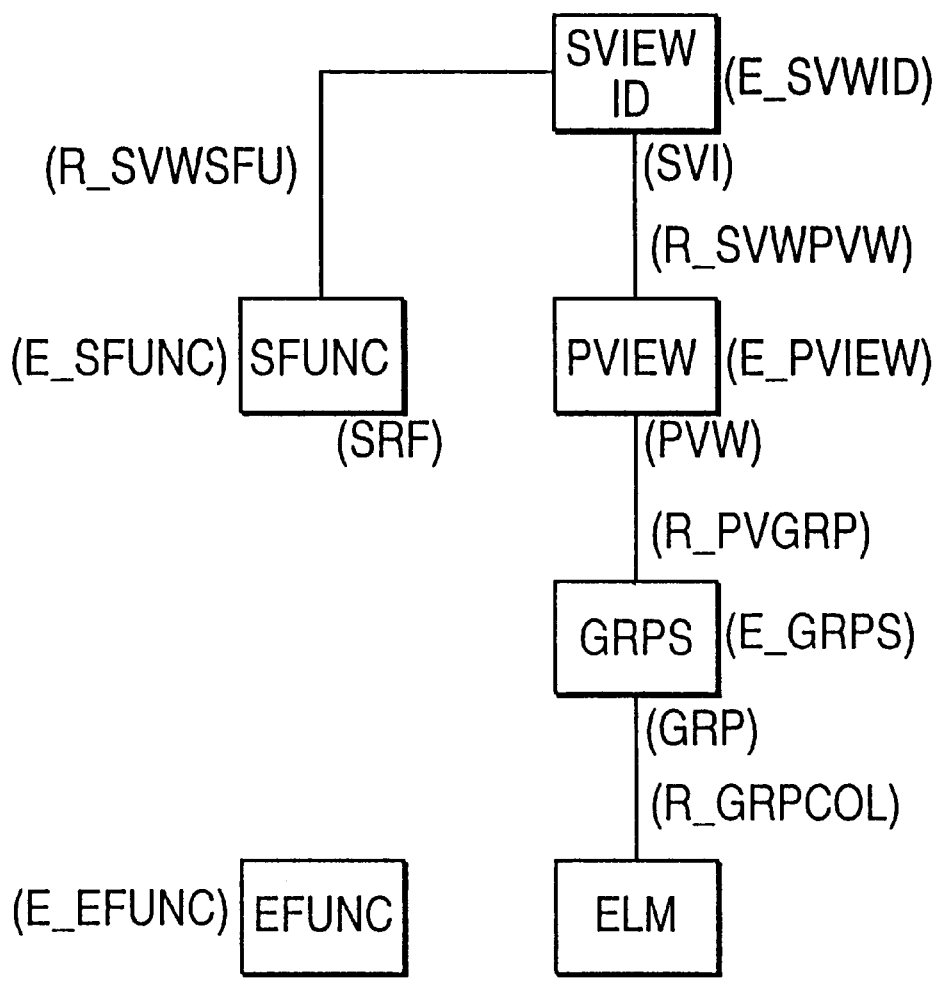

The block diagrams shown in FIGS. 4A–4D illustrate the various tables that hold the definitions for the database engine 40 for accessing the central database 10. FIG. 4A shows the definition tables for the parameter database 32; FIG. 4B shows the definition tables for the generation database 33; FIG. 4C shows the reference tables for the database engine 40; and FIG. 4D shows the definition tables for the domain database 31.

Referring to FIG. 4A, the definition tables for the parameter database include, for example, a "Query Run" table that has the abbreviation "QRN" as an acronym for the table. The Query Run table is populated with information from the initial query entered into the workstation 12. The database engine 40 continually reads the Query Run table to see if any new queries have been requested.

The Query Run table tells the system whether or not a new query is to be processed. If a new query is to be processed, the Query Run table reads the other parameter tables and extracts all the information provided by the workstation 12. The Query Run table then generates the SQL and the Cobal program for the query. The database engine 40 then accesses and extracts data from the central database 10 by generating a query that will run against the household, customer, or account tables.

Another table shown in FIG. 4A is the Query Logical Task table. This table contains information relating to how many tasks have to be performed logically to generate a particular query.

Shown below the Query Logical Task table in FIG. 4A is a Path Relation table. This table is used to target a universe for a particular query. That is, the Path Relation table determines whether the database engine 40 generates household level keys, customer level keys, or account level keys for each query, or whether it generates an output specification for extracting the actual data. The Path table is related to the Path Relation table and informs the database engine whether to use a household or an account path.

The QLT Input table tells the database engine 40 whether the query is an output specification or whether it is extracting a report or a key. This table also provides information as to what type of program is being used to extract a report.

A Path View table is used to explain to the database engine 40 what central database table the user needs to access. A Path Row References table contains information that tells the system the type of path (path id) to be used. For example, the Path Row References table is used to tell the system whether or not to generate a "contain." A contain is a command used to extract all households, customers, or accounts that have (or offer) certain financial products (e.g., checking, saving, CDs. etc.). A contain can also be used to retrieve households only in a particular bank or branch.

The Path Clause table provides additional constraint information that the user can type in. For example, in addition to a person having a checking and a saving, a query can be limited to such persons that also have a saving balance greater than $10,000. That information would be stored in the Path Clause table.

The generation database tables shown in FIG. 4B contain some of the same tables as the parameter database of FIG. 4A. The area of the query run is read again by the database engine 40. The generation database contains all the information that is generated based on the information in the parameter database. That information is read and logically manipulated to build SQL that will then be embedded into a Cobal program to extract the data. The SQL Code table contains the actual SQL code generated by the database. After the SQL code information is stored on the SQL table, the other parts of the database engine 40 read the information from this table.

Another part of the database engine 40 extracts the SQL code from the generation database and embeds the SQL into a Cobal program. The system then uses that Cobal program to build the JCL. The system generates all the JCL it needs using standard JCLs and then submits this job to an internal reader where the job gets compiled. This job in turn generates another job that submits the actual execution job. The execution job then extracts the requested data from the central database 10.

The reference tables shown in FIG. 4C include a variety of tables used to provide reference information for formulating a query. A Key Type table contains the types of keys to be extracted and information about the columns for each of the keys. A System Control table is a parameter table that gives a feed for dynamically changing the parameters that the system uses. A Job Log table keeps a log of any errors that occur. A Constraint Type table contains information about the organization to be accessed (e.g., the number of accounts in a particular bank or branch). This information is used for statistical purposes to determine the optimal way of generating the SQL. As described above, there are certain ways to construct SQL statements that make the SQL more efficient for retrieving large numbers of accounts or other information.

For example, when a query is entered the system will determine how many accounts are contained in each of the different types of accounts to be searched (e.g., checking, savings, CDs). The account type that has the least number of accounts (fewest number of rows in the account table) will be put in the SQL first to maximize the speed and efficiency of the search. The same process is used for organizations. That is, if more than one organization (bank, branch, etc.) is to be searched, the system will search the organization with the least number of accounts first.

A Job Active table contains the status of the job as it is being executed. An Organization table contains a description of each bank and branch. A Product table contains a description of each of the products. A View Relationship table contains information about what views are related to what other views and what tables are related to what other tables. An Error table logs all errors that occur during operation of the system.

Referring to FIG. 4D, the Domain Database tables include SView, PView, Groups, Elements, SFunc, and EFunc tables. These tables are maintained in the Brownstone Data Dictionary and are maintained by the database engine 40. The information from these tables is extracted out and placed into another set of DB2 tables containing a super view id. The super view is used to define the logical path for a query and to join certain related tables together.

The database engine 40 allows a user to click and point to information on a user friendly graphic interface at the workstations 12 so that users can easily and quickly access the large and comprehensive central database 10. The workstations 12 pass acronyms and pseudo-code to the database engine 40 which then converts the code into a logical access path to retrieve data from the central database 10. The user has no need to know how to write a program or a line of code for accessing the central database 10 because the database engine 40 generates appropriate SQL for each query. The logical access path generated by the database engine 40 greatly increases the performance of the system thereby making searching a very large database practical.

Micromarketing Center

The micromarketing center 11 includes workstations 12 that are preferably used by bank branches to identify lists of customers based on demographics, account balances, products, ownership, and so forth, for marketing new financial products and services. The micromarketing center 11 generates files containing sales leads that can be downloaded directly into the CCIS 13. The downloaded leads are then transmitted through the CCIS 13 to branch managers who coordinate efforts to work the leads using the CCIS 13 to market the new products or services being offered.

While the single central repository for storing all customer related information throughout the financial institution offers significant potential, the database is necessarily so large that it cannot practically be directly searched. Thus, the present invention includes means for allowing users to dynamically build programs for searching the central database 10.

The system of the present invention includes at least one, and preferably many, workstations 12 in the micromarketing center 11 that allow users to search the information contained on the central database 10 and generate lists of sales leads (i.e., sales targets) for marketing campaigns. The preferred embodiment includes two different versions of workstations—analytic workstations and micromarketing workstations. The analytic workstations allow the user to build a query, define or design a report, and then run the process; i.e., run the query, then run the results of the query into a report. The report can then be downloaded or exported. The micromarketing workstations allow the user to perform the same functions as the analytic workstations, and also to generate marketing information or sales leads and feed the leads directly into the CCIS 13.

The workstations 12 within the micromarketing center 11 include means, preferably in the form of software designed to run on a general purpose computer, for generating a graphic user interface ("GUI") to dynamically build programs for searching the central database 10. The workstation 12 downloads a local copy of all the tables and structures from the central database 10 that can be searched using the workstation 12. This insures that all users of the system are provided with the latest definitions and fields each time they access the system.

In addition, the system includes means for walking users through each step of building a search request, including using pull-down windows, icons, drag-and-drop, and other features that are familiar to modern computer users. Moreover, the system includes means for building "proper" SQL queries for each request, and hiding the special codes and syntax required to insure that these queries will run. Finally, the system includes means for downloading reports and files to the local workstations 12.

A plurality of micromarketing workstations 12 preferably make up the micromarketing center 11 for responding to requests from branch managers for lists of leads for selected sales programs. The sales programs typically involve a marketing campaign for new or existing products or services offered by the financial institution. The micromarketing center 11 works with the branch managers to determine the profile of households, customers, and/or accounts most likely to purchase the products or services of the sales campaign. The micromarketing center then constructs a specific query, runs the query against the central database, and generates a report containing an optimum list of leads for each marketing campaign.

The workstation at the micromarketing center provides means for searching the central database 10 and extracting a list of all households, customers, or accounts that meet a specific selection criteria. The list of leads are then used to target a direct mailing to the customers or households that meet the specific selection criteria for the sales campaign, or the list of leads is sent directly to the CCIS 13.

Figure 5:
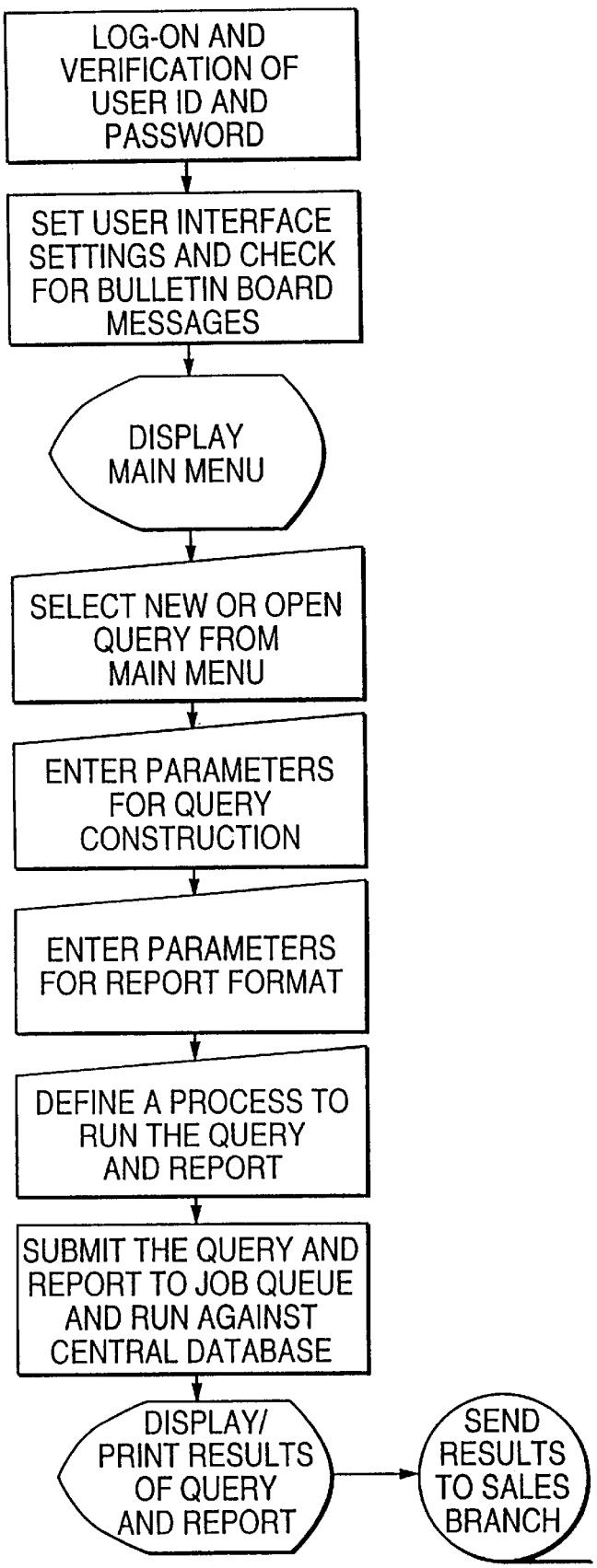
FIG. 5 is a flow chart showing the process steps for generating a list of leads from the central database based on selection criteria entered into a workstation at the micromarketing center.

Referring to FIG. 5, the micromarketing workstations 12 first display a logon screen after power on. The logon screen provides security control of access to the functions of the workstation 12 and the central database 10. After entry of a user ID and password, the workstation 12 activates remote procedure calls to verify the user ID and password against the central database 10. If the user ID and password are valid, the logon window disappears and access to the rest of the system, including further menus on the micromarketing workstation, is provided. If the user is granted access, the user profile, preferences and appropriate remote procedure calls will be read in for initializing and customizing the operating interface.

Figure 5A:
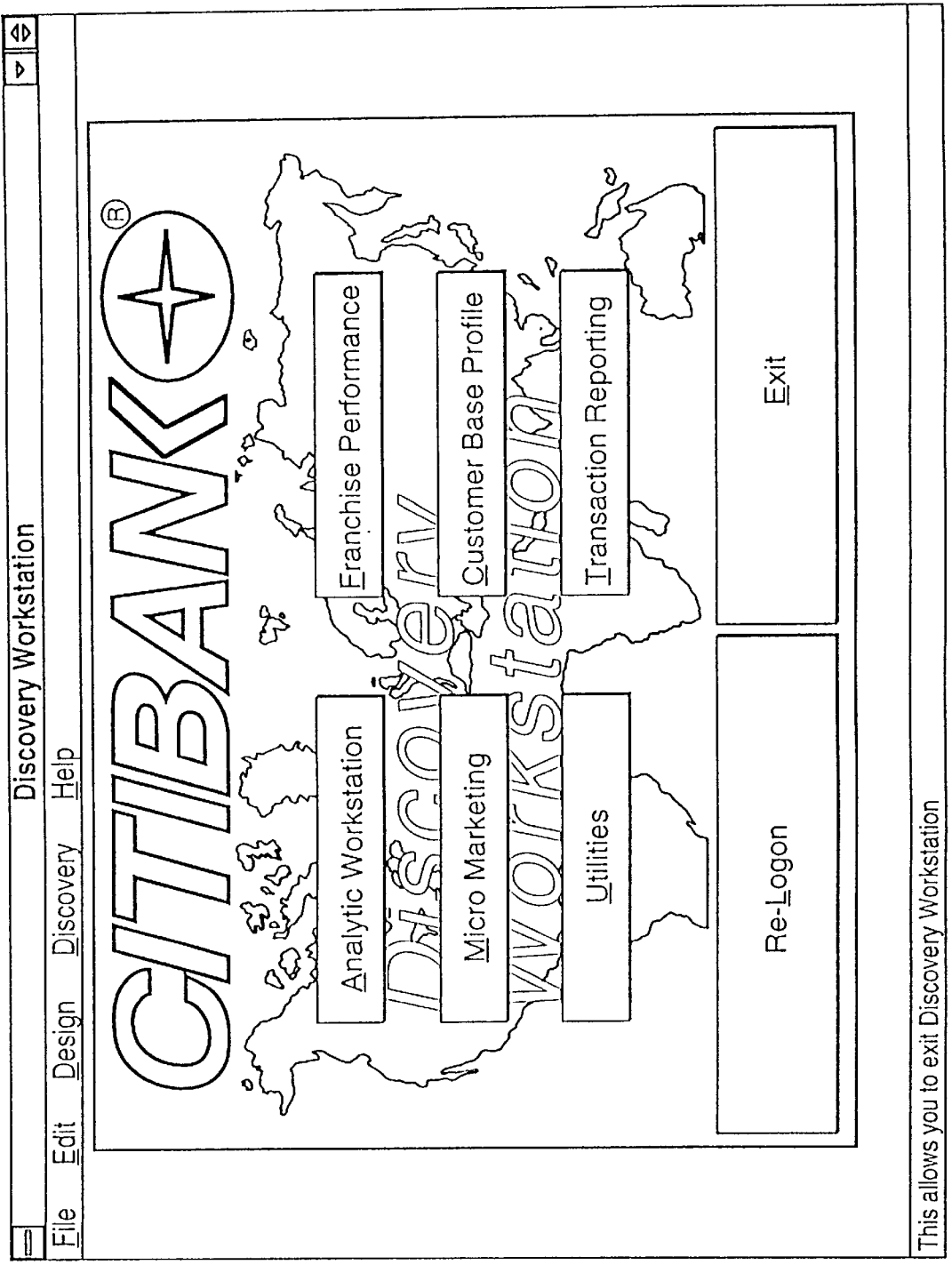
FIGS. 5A–5G are various graphical user interface displays for the workstations in the micromarketing center illustrating the process of logging on, constructing a query, and defining a process for running the query and generating a report.

Following a valid logon, a check will be made for bulletin board messages for the current user ID. If unread messages are found, the user will be prompted to view the list of unread messages, but the user may ignore the prompt and read the messages at a later time. Immediately after log-on, a menu is displayed, as shown in FIG. 5A, to allow the user to select between Analytic Workstation and Micromarketing functions. The menu also provides user access to other functions, including Utilities, Franchise Performance, Customer Base Profile, and Transaction Reporting.

Figure 5B:
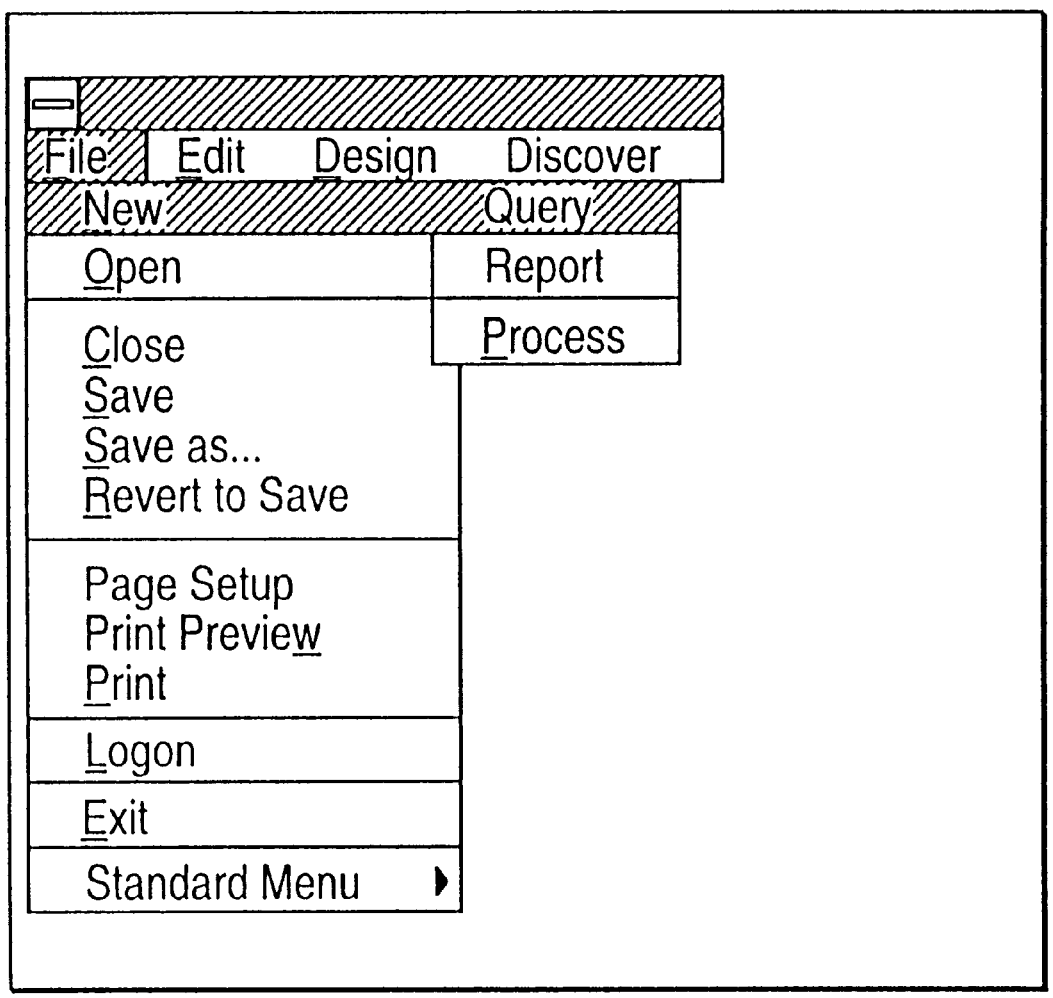

Upon selecting Analytic Workstation or Micromarketing from the menu of FIG. 5A, the workstation will next display a main menu, as shown in FIG. 5B, to provide high-level access to functions required for creating and opening the query, report, and process objects used by the workstation 12. From the main menu, the user is given the option to create a new query, report, or process, or to open an existing one. If the user chooses to create a new query, for example, to fulfill the request of a branch manager, the user next enters the various parameters for the query construction.

After the query is constructed, the user next enters the various parameters for the report format. Finally, the user defines a process to run the query and report, submits the query and report to the job queue, and runs the query and report against the central database 10. When the query and report are complete, the workstation 12 will display or print the results of the search, and will download the results to an output file or directly to the CCIS 13 for delivery to the bank branch that requested the report.

To assure that queries are constructed logically, the conversation should follow a combination of logical steps followed and/or combined with almost free-hand user interaction. The preferred conversation is the speed-select type of conversation. The speed select conversation starts by asking the user what type of query he/she wants to perform. There are two main types: Relationship and non-Relationship. The conversation for the non-Relationship option can be thought of as a subset of the Relationship conversation.

A program tracking file interfaces with speed select by creating a relationship key table using an account file previously registered into the system. Driver files use a similar procedure. After the driver or program tracking file is entered into the system and processed so that a key table is created and saved, the user may continue by selecting either of the above options and proceeding as described below.

The user is asked if she wants to do analysis at the household or customer levels. The answer determines whether keys are saved at the household or customer levels. It also may determine certain join conditions, etc. that will be generated for the user under the covers. The user will proceed by assemblying a query made up of criteria blocks that define the universe of households, customers, and/or accounts desired. After an appropriate query is assembled, the user will run the query by assembling a process made up of process step blocks, such as query and report.

Figure 5C:
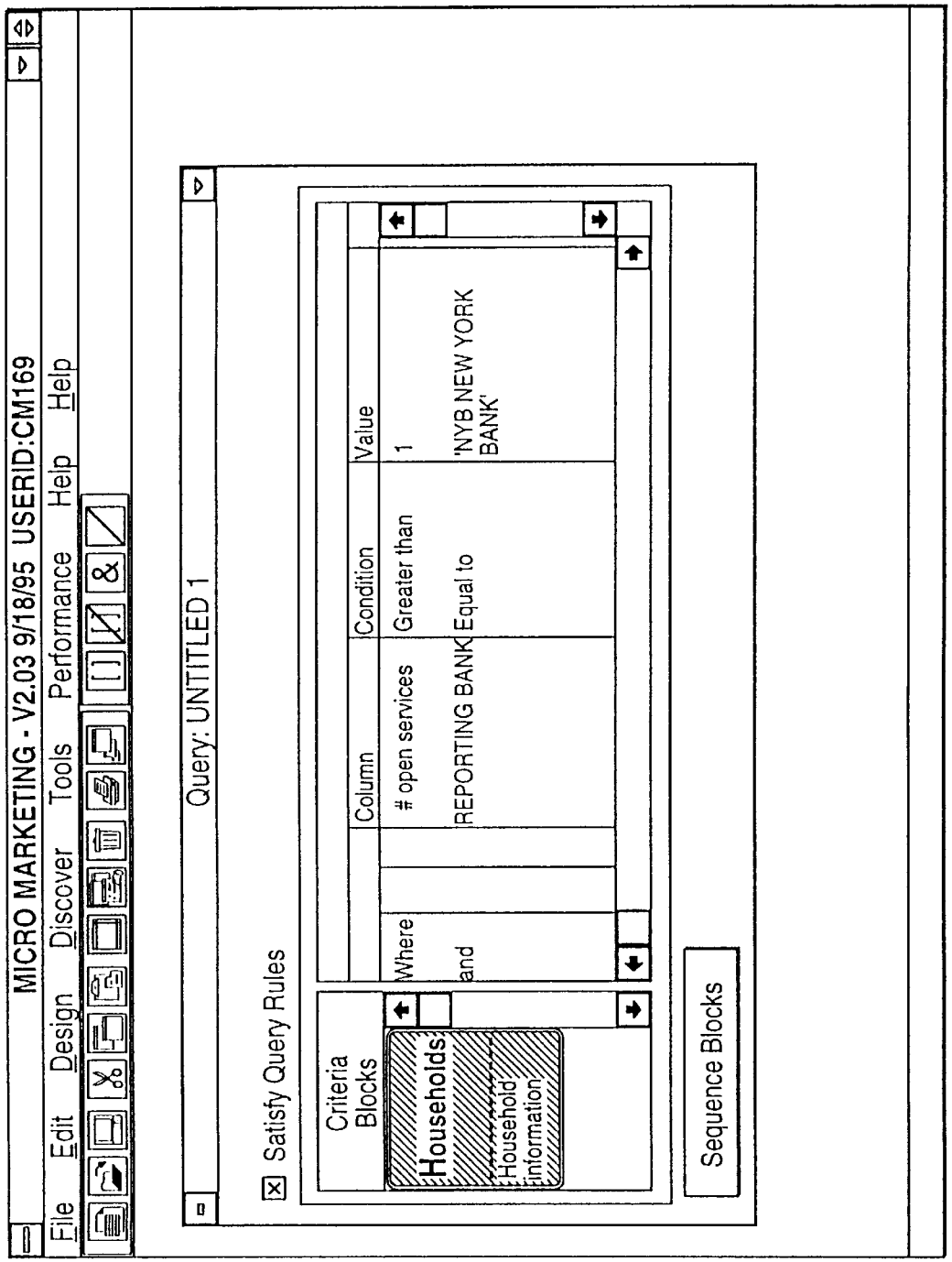
Figure 5D:
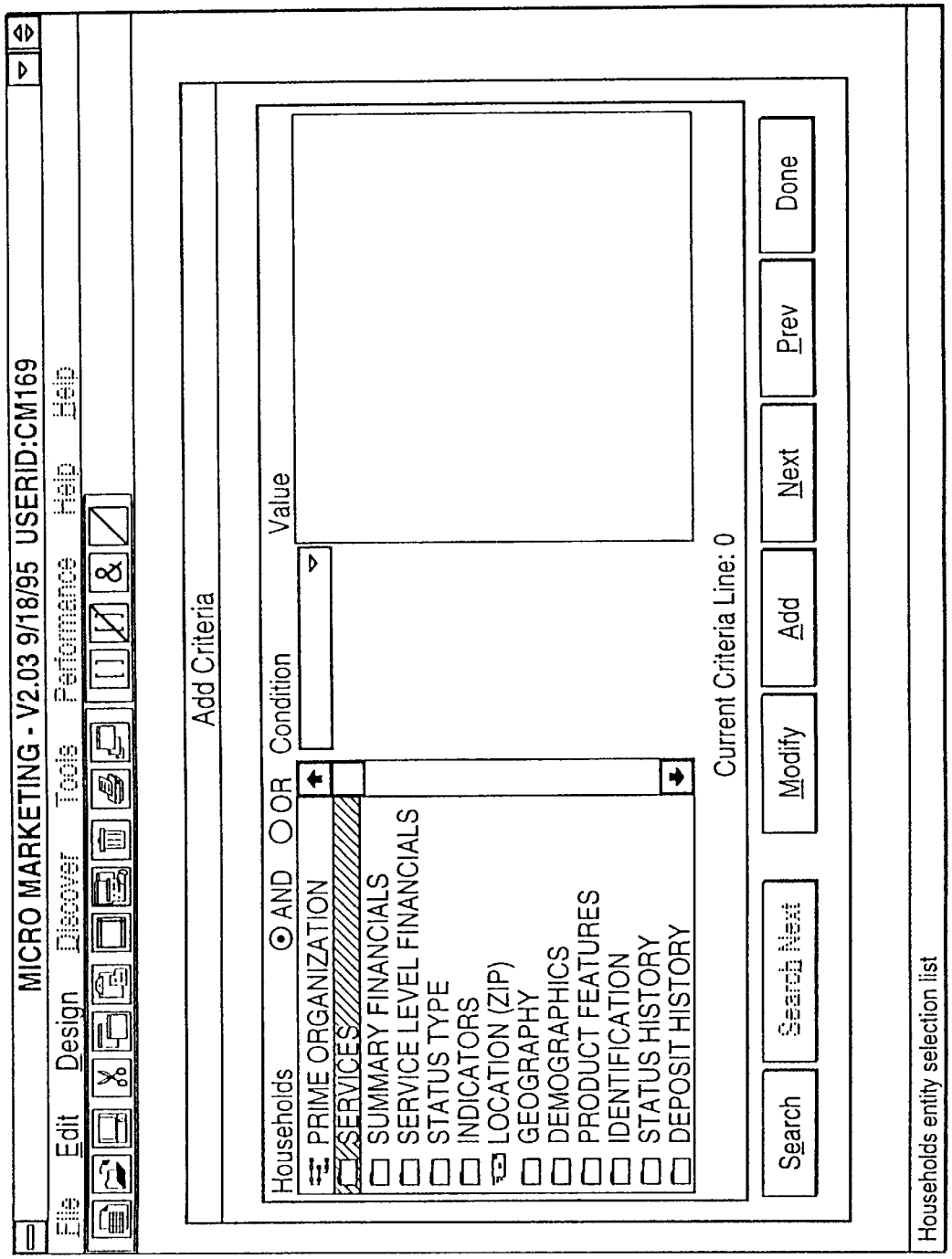
Figure 5E:
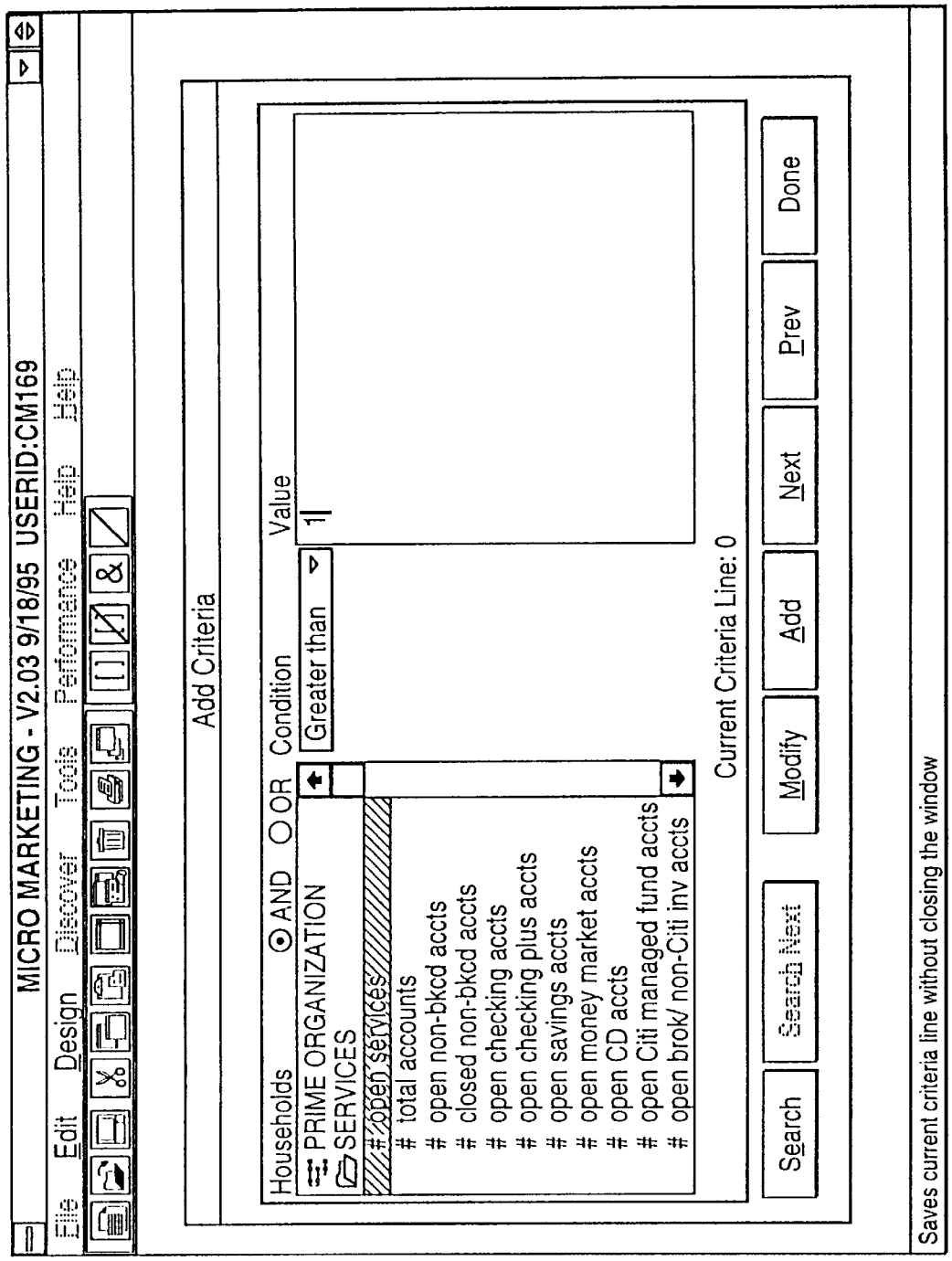

For example, as shown in FIG. 5C, a criteria block defining a universe of households is constructed that limits the universe to households having more than one open services and NYB NEW YORK BANK as the reporting bank. In constructing the criteria block of FIG. 5C, the user is prompted to fill the criteria column by selecting "# open services" and "REPORTING BANK" from criteria lists downloaded from the central data base. In selecting "# open services," the user first selects the category "SERVICES" from an Add Criteria menu shown in FIG. 5D, and then selects "# open services" from the Add Criteria sub-menu shown in FIG. 5E. The condition "Greater than" and the value "1" are also entered or selected from the menu display shown in FIG. 5E. Criteria blocks can also be constructed to define a selected universe of customers and accounts.

Figure 5F:
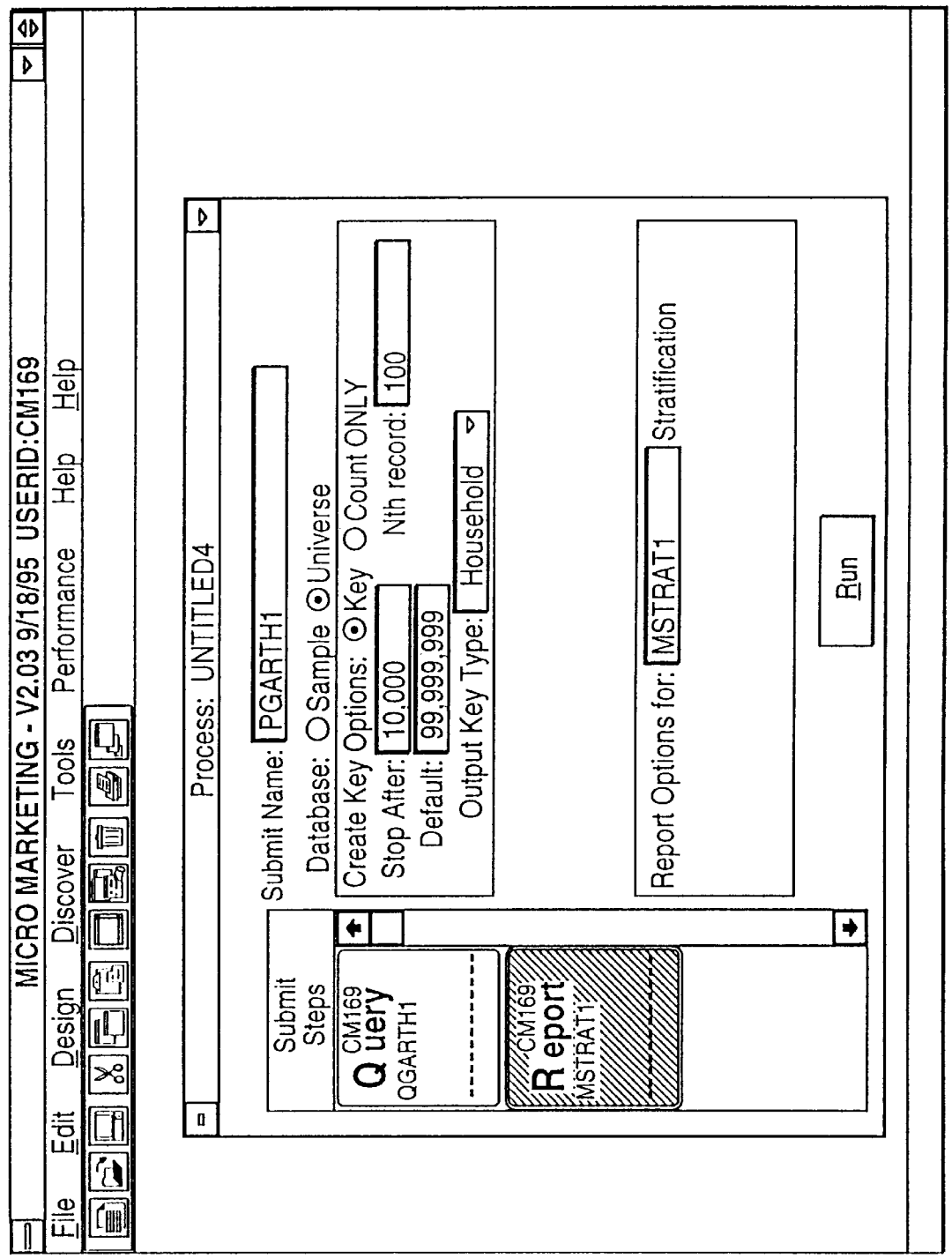
Figure 5G:
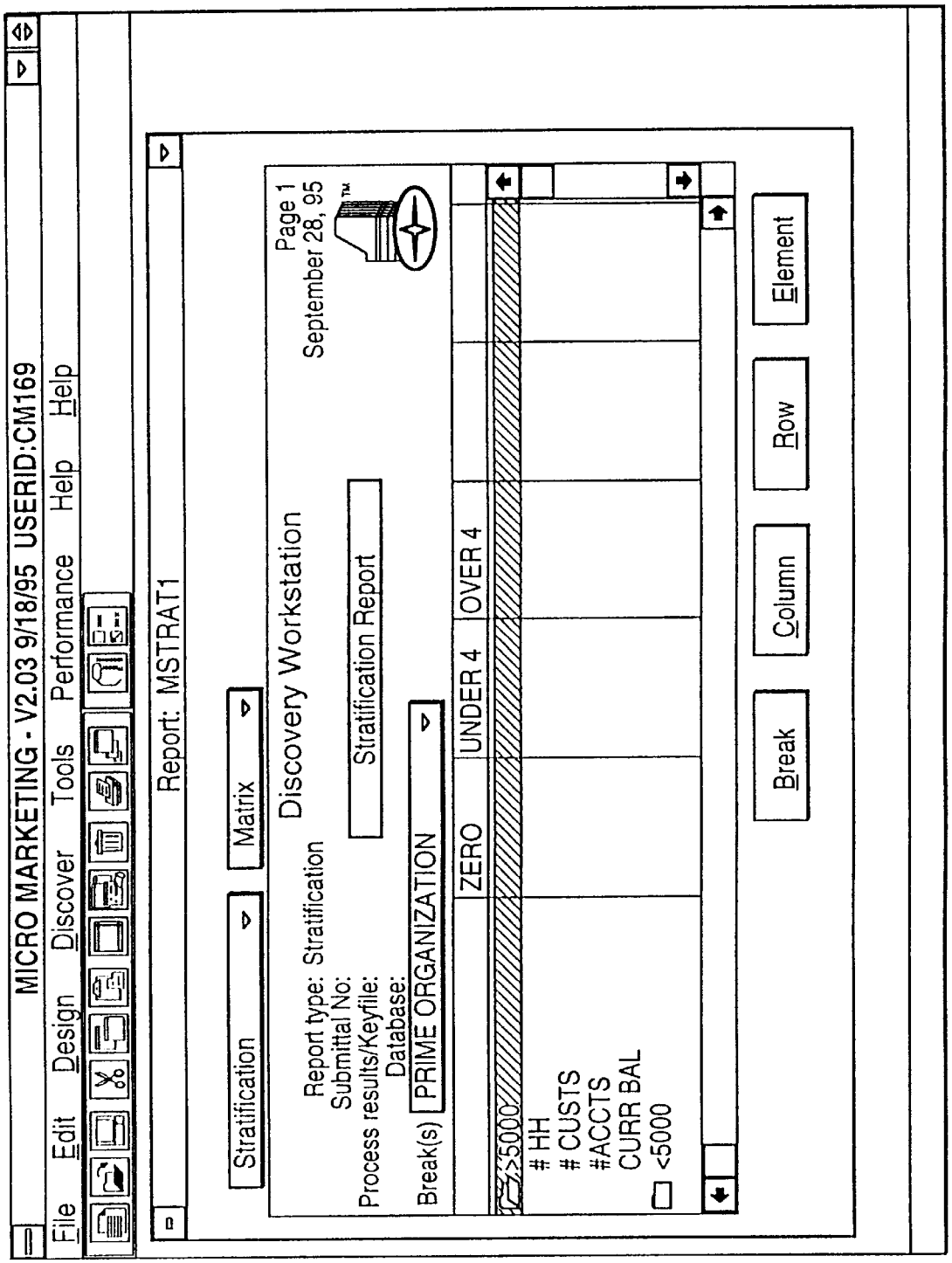

After creating the query, as shown in FIG. 5C, the user runs the query by creating a process using the display shown in FIG. 5F. The process shown in FIG. 5F, for example, submits two steps to the central database: Query and Report. The report step is created by defining the report type and report parameters using the display shown in FIG. 5G. Upon selecting Run from the display screen shown in FIG. 5F, the defined process is performed by the system, i.e., the query is run against the central database and a report is created according to the query results and the defined report parameters.

Complement and General Limiting Criteria

The user will be asked to enter its Complement (universe) Limiting Criteria and the level at which it would be applied. The Complement Limiting Criteria is a type of criteria that limits the set of households (or customers) to be searched when the complement of a selection criteria is desired. A complement search is typical of NOT IN or NOT CONTAINS logic or functions.

The way to calculate these functions is to first find the keys (households or customers) that satisfy the positive condition. Then the complement of these keys is obtained. For example, if the households that do not have a certain product are desired, the system will first find the households that have the product, and then find the complement of these households. In searching for the complement, the set of households to be searched must be limited or the results will generally be undesirable. The criteria that limits the households to be searched during the complement operation will be referred to as Complement limiting criteria.

Two types of complement limiting criteria that are preferably used in the present invention are: location (organization) criteria and geographical criteria. The location criteria should always be required. Initial values may be assigned from the user profile. Each user is assigned to a maximum organization level whose data the user can access. A default location criteria will be assigned to the user's query, which the user can vary as long as the user limits the data further (by specifying one or more lower organization level within his own hierarchy path). The location criteria is used to schedule the job as a quick or long running job.

The location criteria fields are preferably in their own selection list. The workstation should ensure that any entries do not violate the user profile. However, the user should be forced to go through this selection process at least once.

The Geographical criteria includes fields such as state code, zip code, etc. These fields should also be in their own window selection list.

In addition to the complement limiting criteria described above, general limiting criteria are provided that have the common characteristic of appearing at all levels of the database hierarchy (household, customer, and account). At the account level the general limiting criteria are Actual values associated with each account. At the household and customer levels these are values derived from the Prime account.

Therefore, Complement Limiting Criteria can be applied three ways: at the Actual level, at the Prime level or at both levels. The user is asked at which level he wants to do the analysis and the workstation then generates the appropriate selection criteria at whatever level is desired.

If the Prime level is selected, it will be applied across the board. If the actual level (or both levels) is selected, the user should be given the opportunity to change the Complement Limiting criteria every time an account path is entered.

If a key table is saved, the key table may be used in NOT IN operations as long as the NOT IN appears together with the AND operator (AND NOT IN Key table).

The level of application of complement limiting criteria can be asked for in their own window that is associated to the location and geographic selection lists mentioned above.

The user is given the opportunity to specify key table operations by: 1) specifying if she wants to save the keys produced; and 2) incorporating previously saved keys in the current selection process.

If the user does not want to save the keys produced, the user will be forced later on to specify a list of output columns, the format of the output, etc. In other words the user will be forced to go through an output specification conversation. If so desired, Keys will be saved for later reuse at the (household or customer) level specified by the user.

If the user wants to reuse a previously saved key table, a window will open on the workstation interface to show a list of key tables available to him. The user can then point to a key table in the list to get further information about it. The capability of reusing and further refining key tables makes the system very flexible.

Once the above basic questions are out of the way, the workstation can show a menu of a series of selection lists pointing to various data groupings available to the user, one each for household, customer and the Asset & Liability and Bankcard account tables. Each selection list will have an associated selection criteria window where the user will see the criteria being built with data of that list.

In addition to the data selection windows there should be a Path Interrelationship window where the low level selection criteria under each window will be related among themselves with logical operators and parenthesis, as further described below.

The workstations in the micromarketing center provide for operations using data selection lists in generating queries and defining reports. Use of these data selection lists will now be described.

Household and Customer Selection Lists or Paths

A first set of windows are provided on the workstation interface to create selection criteria using household and customer columns, respectively. The workstation will help the user to do this task graphically.

For example, the user may point to a column, choose among SQL operators, and pick from a list of valid codes. As the user completely identifies a full SQL predicate, the predicate is moved into the associated selection criteria window, in "ghost" fashion. The user can then pick the predicate and insert it into a specific portion of the selection criteria window at which time the user can select among AND/OR/NOT and parenthesis operators to associate the predicate with other criteria already in the selection window. In similar fashion the user can move or delete any previously entered predicate within the selection criteria window and/or add/delete/move any parenthesis.

The workstation helps the user create predicates that include any SQL function and/or set of arithmetic operators, so that the user can include those in the selection criteria. Any initial predicate entry into the selection criteria window associated with a data window will automatically create an entry for that data path into the Path Interrelationship window, which can be manipulated as discussed below.

Account: Selection Lists or Paths

Account selection lists (account paths) under the relationship option present some special situations. First, the account selection lists work together with Account Path functions. There are four initial account path functions:

1. Household (customer) CoNTains Accounts
2. Household (customer) Does Not CoNTain Accounts
3. Household (customer) Contains Accounts having certain AGGregate characteristics.
4. Household (customer) Does Not Contain Accounts having certain AGGregate characteristics.

For the Household CoNTains/Not CoNTains Accounts path functions, the user picks a function and then specifies the criteria at the account level for that function, in a manner similar to the way criteria is specified for the household and customer above. This specification will also create an entry in the Path Interrelationship window.

Each of the functions have their own special characteristics. The first two allow the entry of selection criteria that are referred to herein as a simple account path. There are three versions of simple Account Path criteria:

1. CG_PROD_TYPE=A AND (CG_ACCT_BAL>1000 AND . . . )
2. (CG_PROD_TYPE=A AND (CG_ACCT_BAL>1000 AND . . . )
    OR
    (CG_PROD_TYPE=B AND (CG_ACCT_BAL<3000 AND . . . )
3. CG_PROD_TYPE IN (A,B,C) AND (CG_ACCT_BAL>1000 AND/OR . . . )

The three formulations for simple account path criteria are possible, but provide very different answers. The second is a generalization of the first and the third is a special case of the second. For non-expert users, it may be desirable to have the workstation limit users to one and two. Therefore, a single selection criteria can construct a Household CoN-Tains function that selects households that have any of one or more products with particular characteristics.

The selection criteria for the Household Contains/Not Contains Accounts Having Certain Aggregate Characteristics function has two parts. In the first part, the user specifies the products whose characteristics are to be aggregated. This first part is similar to the simple account path criteria described above.

In the second part, the user specifies which characteristics are to be aggregated and the aggregate conditions under which the household (customer) would be selected. Aggregations can be Counts, Sums or Averages. A typical criteria will be:

Under a WHERE clause:
   CG_PROD_TYPE=A AND (CG_ACCT_BAL>1000 AND . . . )
Under a HAVING clause:
   (SUM(CG_ACCT_BAL)>5000 AND COUNT(*)>3)

The Selecting products function is also organized by the workstation. Instead of presenting different column names (CG_SERV_TYP, CG_PROD_TYP and CG_SUB_PROD_TYP), the workstation presents a hierarchy of products. The hierarchy is preferably presented graphically, and includes higher level aggregations (asset or liability, deposit vs. loans, revolving vs. non-revolving etc.). The user may select a product set at any level of the hierarchy. If the selected product set is not stored as a value/column in the database (a revolving flag for example), the workstation will generate a compound predicate or IN list with the values within the hierarchy that are equivalent to the product set desired by the user.

If the selection is done at the CG_SERV_TYP level and aggregate functions are requested, the workstation will recognize that these may exist at the household (customer) level already and use them. The database will ascertain whether the user has specified criteria at the account level that is consistent with what is in storage at the household or customer level in the central database 10.

As the user enters selection criteria associated with the different data selection lists (and also using the account functions) a higher level inter path logic must be defined. The user will be asked to enter logical operators and/or parenthesis to define this logic. It is this high level logic that will guide the generation program. As described above for the individual selection criteria associated with a data path, the user will be able to point & click a component of a predicate and drag(move) or delete it, etc. A double click activates the detail selection criteria window for the component of the predicate (key table components will display the description of the key table). At any time the user can print this or any other data/selection criteria window of the query, or the full query details.

Although SQL provides a language to build selection criteria, the higher level functions supported by the system require a higher level set of keywords. This set of keywords is used at the Path Interrelationship window, but is also useful at each individual selection criteria window. To give an idea of these high level set of keywords a preferred general format follows with some examples.

General Format
   {Path}{*high level function @ function-seq-no} {* SQ1 or other clauses and/or parenthesis}
Examples of Paths
   HHD—criteria at the household level was entered.
   CUS—criteria at the customer level was entered.
   LOC*Lvl—Location criteria at the Prime (P), Actual (A), or both levels (PA).

GEO*Lvl—Geographic criteria at the Prime (P), Actual (A), or both levels (PA).
  ALA—criteria for Asset & Liability accounts
  BC—criteria for Bankcard accounts.
  Examples of High Level Functions
  CONT—household (customer) contains accounts of specified products
  NCONT—household (customer) does not contain accounts of specified products
  AGG—household (customer) has product with certain-aggregate (household, customer) characteristics (SUM, AVG,COUNT).
  NAGG—household (customer) is lacking a product with certain aggregate (household, customer) characteristics (SUM, AVG, COUNT).
  Examples of Clauses
  PROD—A simple product (account type) criteria. The product can be specified at various levels (SERV-TYP, PTYPE, STYP or pre-defined grouping such as all assets, all liabilities, all revolving credit, non-revolving credit, etc.)
  HAVING—Describes the aggregate characteristics desired for selected simple product criteria.

The above keywords are combined with AND, OR, NOT (in) and parenthesis in the path Interrelationship screen or at the Selection criteria screen. For example, at the path interrelationship screen, the keywords can be combined as follows:

HHD AND CUS AND LOC*P AND GEO*P AND
((ALA*CONT@1 AND ALA*AGG@2) OR
(SAVED-KEY-TABLE))

At the Individual Path Selection Window, the keywords can be combined for asset/liability accounts, for example, as follows:

(CONT@1 [PROD (SERV_TYP='CHK' AND CG_ACCT_BAL>2000)]
AND
AGG@2 [PROD (PROD_TYP='CD6')
HAVING (SUM(CG_ACCT_BAL)>1000 AND COUNT>=1)])

At the selection criteria window the user will see a detail of the high level logic described in the path interrelationship window. The AGG, CONT, etc. serve as markers for high level functions. In a DAX/Prime type of query these functions do not exist and the selection criteria should look similar to straight SQL criteria. Alternatively, the Path Interrelationship window can be avoided by having the workstation generate a simulation of it for the mainframe to analyze, or by having the database generator at the mainframe do more work to breakdown the request.

The workstation may also be equipped to handle predicates that cross over paths as shown, for example, in the following statement:

(HH_FIPS_ST_CD='36' or CG_FIPS_ST_CD='36')

However, except for LOCation or Geographic data there is usually no need for this type of criteria and these cases can be taken care of by merely asking whether the user wants to apply these criteria at the Prime or Actual level.

After the user finishes all the above steps, she can submit her query for execution and follow its progress on the job control subsystem. Alternatively, the user can enter the output specifications to use with the selection criteria (universe selection).rep Central Customer Information System The CCIS 13 preferably includes workstations located in the bank branches for each of the personal bankers and branch managers, and also in the main office of the community bank for the officers and/or sales managers of the community bank. Each of the various workstations of the CCIS 13 has a different function, depending upon the user's responsibilities and duties within the bank.

The branch managers receive the list of leads generated by the micromarketing center 11 and electronically load the leads into the CCIS workstations for distribution among selected personal bankers within the branch. The branch managers assign the leads to the personal bankers most qualified to handle the leads, or based on the workload and availability of the personal bankers.

The personal bankers receive access to the list of leads on the CCIS workstation after the list is generated by the micromarketing center and communicated to the CCIS. The personal bankers then conduct sales sessions (e.g., telephone calls) with each of the customers on the list of leads. Before and during the sales sessions, the personal bankers use the CCIS 13 to view a complete profile (in detail or in summary form) of the customer's relationship with the bank and any other demographic information about the customer contained on the central database 10. This allows the personal banker to speak intelligently with the customer during the sales session and thereby increase the success rate of the marketing campaign.

The branch managers and bank officers, in turn, use the CCIS 13 as a tracking and reporting management tool to automatically capture daily sales information. The branch managers and officers access the detailed sales transactions for each personal banker using the CCIS 13, and view the sales results for the various campaigns to track the performance and make adjustments in the campaigns as necessary. The branch managers and bank officers can also use the CCIS 13 to reassign leads among personal bankers and/or branches to optimize the use of marketing resources.

The CCIS 13 therefore is a marketing, management, and sales tool. The CCIS 13 includes several integrated components that are used to view customer information and manage customer contacts and relationships. The operation of the CCIS 13 is described below.

Figure 6A:
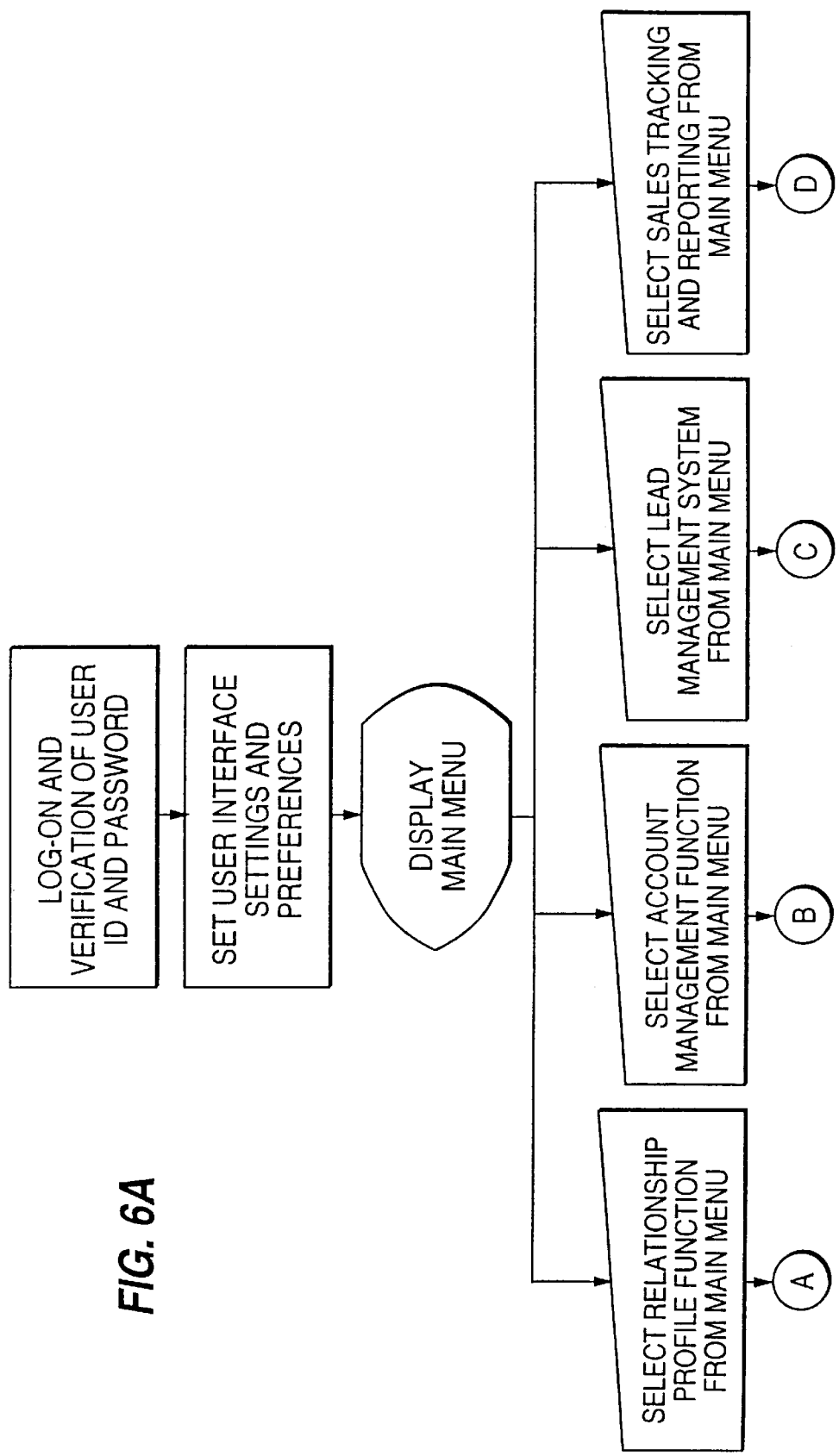
FIG. 6A is a flow chart showing the initial process steps of accessing and entering information from the central customer information system.

Referring to FIG. 6A, the workstations of the CCIS 13 first require a logon and verification procedure similar to the workstations of the micromarketing center 11. Users enter their user ID and password into the workstation, and the system verifies the ID and password against the central database 10 to set the user's interface settings and preferences and determine the user's entitlements. Upon entry of a valid user ID and password, the workstation then displays a main menu giving the user the option of selecting a relationship profile component, an account management component, a lead management system, or a sales tracking and reporting component. These components are each described below.

Relationship Profile Component

The relationship profile component of the CCIS 13 allows appropriate staff members to find and view household, customer, and account level information. The relationship profile component shows current and historical financial and behavioral information about the total relationship of the household or customer with the financial institution. It contains information on individual accounts owned, how customers do their banking at the financial institution, and whether they are managed by a particular personal banker. The relationship profile component provides a sales preparation tool that displays all the information available about the customer, the customer's relationships to other customers, and in-depth account information on all accounts owned by the customer and/or the entire household.

Information is available in the relationship profile component in detail as well as in summary forms. In combination, the information in the relationship profile can be used to gauge the depth of each banking relationship in order to better prepare for sales and service conversations.

The relationship profile component includes a promotional suppression facility that allows the financial institution to flag or otherwise identify those customers and non-customers who have requested not to be contacted by phone, by mail, or both. Customers who do not want promotional contacts may be registered on a promotional suppression screen in the relationship profile or relationship building functions if the customer is listed as a lead in a campaign. Non-customers who do not wish to be solicited can also be registered on a suppression screen from the main menu.

Once the customer is identified, the suppression flag is automatically transferred to all applicable customer information screens and also becomes part of the list generation process to insure that these customers are not contacted.

The relationship profile component also includes a customer promotional contact history file that contains information about prior customer contacts in which the customer participated in a mail or telemarketing campaign. Customer contact information may be viewed using the relationship profile component or the relationship building function.

The contact history file is important because it prevents the various businesses within the financial institution from "overcontacting" customers. It helps to unify and manage the customer contact process.

Figure 6B:
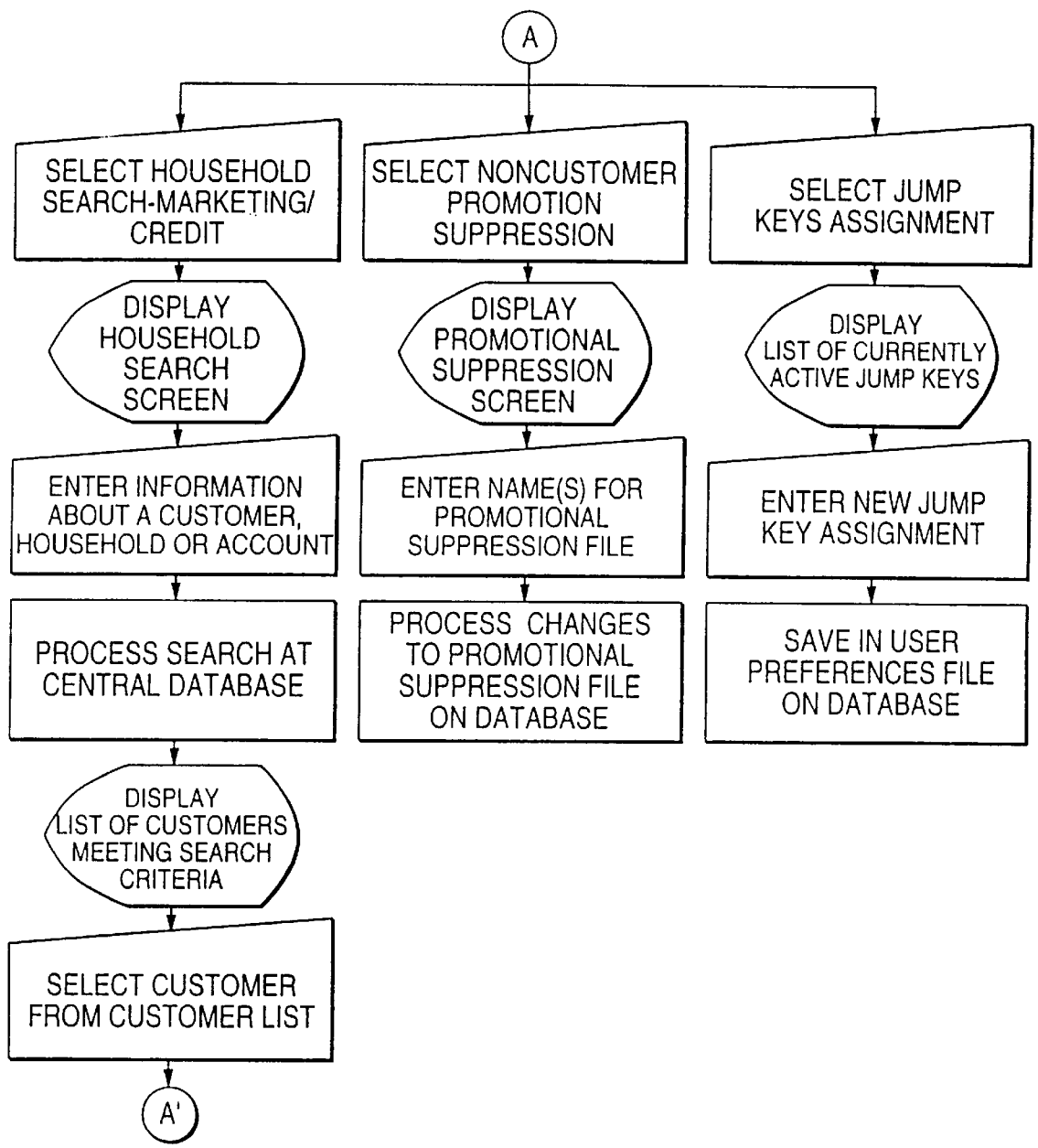
FIGS. 6B–6C are flow charts showing process steps for viewing various customer and household profile screens from a workstation in the central customer information system.

Referring to FIG. 6B, in selecting the relationship profile component from the main menu, the user is given the option of selecting a household search function, a promotion suppression function, or assigning jump keys to various relationship profile screens. If the household search function is selected, the user is prompted to enter selection criteria (e.g., a unique identifier number, name, address, bank, branch, service, etc.) to find and view information about a particular customer, household, or account.

The search function may be used in two ways: to help narrow a search for a specific customer or to view an enrollment program customer list. Each function allows the user to select a particular customer in order to view information about that customer.

In viewing an enrollment program customer list, the user can enter the personal banker's personnel number and the name of the enrollment program. The system will then provide an alphabetical listing of households assigned to the personal banker, any of which households can be selected for viewing detailed information about the household.

Figure 6C:
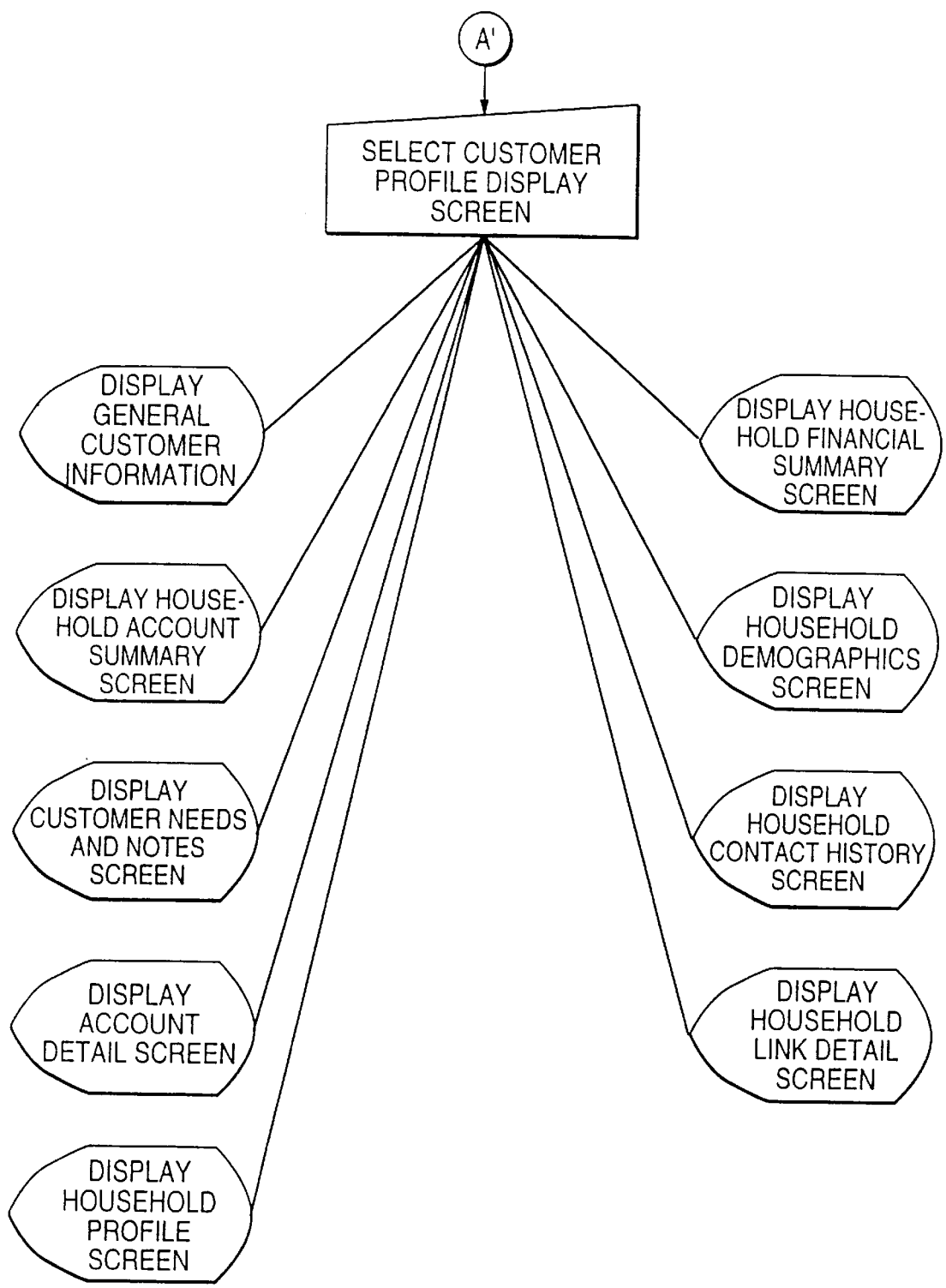

Once the particular customer, household, or account is identified, a number of customized display screens are available to present the information about the customer. As shown in FIG. 6C, for example, the user can select from among a general customer information screen, a household summary screen, a customer needs and notes screen, an account detail screen, a household profile screen, a household financial summary screen, a household demographics screen, a household contact history screen, and a household link detail screen.

The general customer information screen displays general customer information, including products owned, services used, and customer behavior. The customer information on this screen includes the primary name and address for the customer and the "best" phone number based on internal feeds into the central database and external matches, and the name of the customer's personal banker (if any). The customer information on this screen also includes details of the customer's activities, including the number of checks written, teller transactions, ATM usage, electronic and phone banking services used, payments made with checks from financial competitors, current and historic balances, customer net revenue, credit card usage patterns, the branch where the customer's primary account is domiciled, the customer's preferred branches based on frequency of use, and other products and services used by the customer.

The household account summary screen shows accounts and other information for all members of a selected household. The user can view detailed product and account information by selecting the product or account from the list displayed on the household account summary screen.

The customer needs and notes screen identifies possible sales opportunities based on account ownership, balances, and customer behavior. These are system generated tags. The screen also allows the user to add the user's own notes to capture information about the customer (e.g., homeowner, children, competitor, business address change, etc.) or record telemarketing calls to the customer.

The account detail screen shows information about a single account. A top portion of the screen shows customer information, while a bottom portion of the screen shows details about the specific account, including a balance history where applicable.

The household profile screen displays information about the entire household. It includes aggregate financial and product information, specific information about each member of the household, and appended external "best guess" demographic information for use in planning calls or for developing sales plans. The household profile screen also displays the primary name, address, phone number, and branch for the household, as taken from the primary account in the household.

The household/customer financial summary screen aggregates accounts owned by all members of a household or by a particular customer into product types (major services) and compares balances to the prior month and the prior year. Summaries are available for total accounts, private bank accounts, commercial accounts only, or retail accounts only. All product types owned by the household or customer will be displayed, including investment services such as brokerage accounts and managed funds, credit services such as bank cards, credit lines, mortgages, secured credit, and business and professional credit products, and other fee-based services such as safe deposit and insurance.

The household demographics screen displays appended household information purchased from outside sources. This screen may also display information that is inferred from other information about the customer. For example, repeated usage of a credit card at a baby supply store might be used to infer that the customer has one or more small children.

The household contact history screen displays household level information about telemarketing and mail contacts. The information comes from the customer contact history file which captures information about customer contacts (both telemarketing calls and mailings) from the various businesses of the financial institution and from use of the relationship building function.

The household link detail screen displays the links used by the central database 10 householding process to bring customer accounts together. It displays the account number, the last name or business name on the account, the zip code, the link type, and the link value.

In order to properly manage certain households it is necessary to link two or more households together or to de-link parts of a household to make separate households. The CCIS 13 includes means for bringing accounts together or de-linking accounts based upon information received from the source systems, such as common names and addresses, social security numbers, and account links.

Account Management Component

The account management component of the CCIS 13 is a system for account officers to use to manage groups of households and/or customers by enrolling them into special programs provided by the financial institution. Once the household or customer is enrolled in a program and is assigned to a personal banker, the personal banker can offer the customer personal relationship management to better manage the customer's banking relationships. The customer will be "flagged" as a managed household to alert other sales staff that the customer has an exclusive relationship with a personal banker. It also guarantees that leads distributed from the micromarketing center 11 are assigned to the personal banker for that customer. The customer has the added benefit of dealing with only one personal banker who understands the customer's needs.

The account management component includes on-line report viewing and printing facilities that generate monthly reports used by personal bankers and their branch managers to evaluate program growth. Reports show account management program information in a variety of ways, from individual account and customer level information to summary overviews for the entire portfolio.

Figure 7:
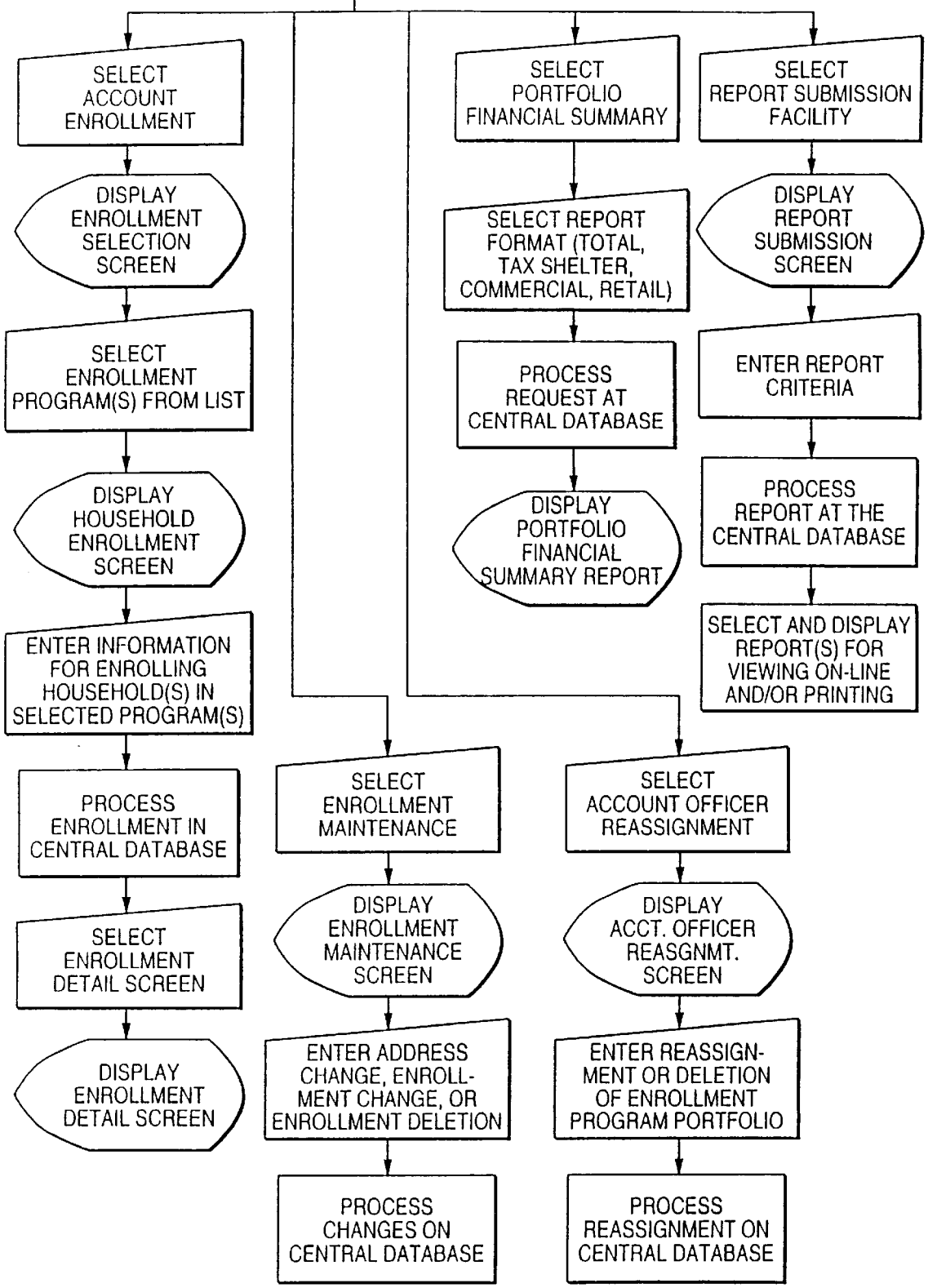
FIG. 7 is a flow chart showing process steps for account management functions using the central customer information system.

Referring to FIG. 7, in selecting the account management component from the main menu, the user has the option of selecting account enrollment, enrollment maintenance, account officer reassignment, portfolio financial summary, or a report submission facility. These functions will be described in turn.

By selecting account enrollment, the workstation displays an enrollment selection screen. The enrollment selection screen allows the user to select a program, supply program information, and enroll households in a particular program. The list of enrollment programs is updated and maintained on the central database 10.

After a particular program or programs are selected from the list, a household enrollment screen will be displayed that allows the user to enroll several households in one program at a time. The user enters the information for each household, including the account number and special address (if any). The enrollment is then processed in the central database 10 and can be displayed by selecting the enrollment detail screen. To avoid enrolling a household in more than one enrollment program or to more than one personal banker, the CCIS 13 automatically displays the enrollment detail screen and alerts the user whenever a user tries to enroll a customer into an account management program and the household is already enrolled in an active program.

By selecting enrollment maintenance from the main menu, a mailing address or enrollment maintenance screen is displayed to select or create a special home and/or business address that is only valid for the CCIS enrollment program, or to make an enrollment change or deletion on the CCIS 13.

By selecting account officer reassignment from the main menu, an account officer reassignment screen is displayed to reassign or delete a personal banker's full portfolio of households in an enrollment program. This feature is preferably accessible to only those users having control officer entitlements.

Reassignments can be for all enrollment programs or for only selected programs, and can be used to reassign the same officer to a different branch or to reassign the enrollment programs to another officer at the same branch or a different branch.

By selecting portfolio financial summary from the main menu, the user can select a report format and display a dynamic report showing current enrollments. The portfolio financial summary is an on-line report that displays summary information based on the accounts belonging to households enrolled in a program assigned to an individual account officer. It aggregates accounts in the portfolio into product types and compares balances and customer net revenue to a month ago and a year ago. Separate summaries are preferably available for total accounts, tax shelter accounts, commercial accounts, and retail accounts.

By selecting the report submission facility from the main menu, the user can run reports and place them in a file so that they can be viewed and/or printed from the report viewing facility, or sent to a central data center for printing. These reports preferably include an account officer summary, a portfolio summary, a growth measurements summary, and a household profile. The reports are "point in time" reports available at personal banker, branch, area, and bank levels.

Lead Management System

The lead management system of the CCIS 13 provides full lead management capabilities through on-line delivery of sales lists to personal bankers. It supports a comprehensive sales process with numerous options for working sales leads, including the ability to place active leads into a calendar for further action, to add new leads (both current customers and non-customers), and to transfer leads on-line to specialists or other personal bankers within the financial institution for future action.

The lead management system is the contact management component of the CCIS 13. The lead management system provides paperless delivery of leads to personal bankers, paperless delivery of referrals to appropriate specialists across the financial institution, and paperless capture of sales activities.

The lead management system supports a comprehensive sales process. Personal bankers have many options for working sales leads. They may work against an appointment calendar, the "next" customer in the priority queue regardless of campaign, the "next" customer for a particular campaign, or leads already in progress.

The lead management system also allows users to add leads directly to the CCIS 13. These can be leads that they will work personally or leads that they will refer to other experts within the financial institution.

Personal bankers are offered a full array of sales preparation information about the campaign and the customer to prepare for the sales contact. Results of the contact are fed into a personal calendar function which is updated in real time. This allows the personal banker to schedule and track follow-ups on each sales call.

Branch managers and area directors can view lead statistics, such as ratios of leads being worked versus those not being worked among branches for campaigns and among personal bankers in specific branches. Leads can be assigned and reassigned so that they are more effectively distributed.

The lead management system starts with a database of leads for each personal banker. These are organized by program and are prioritized so that the best leads are worked first. These leads also honor account officer assignments so that leads are first directed to the personal banker or officer assigned to the relationship.

Figure 8A:
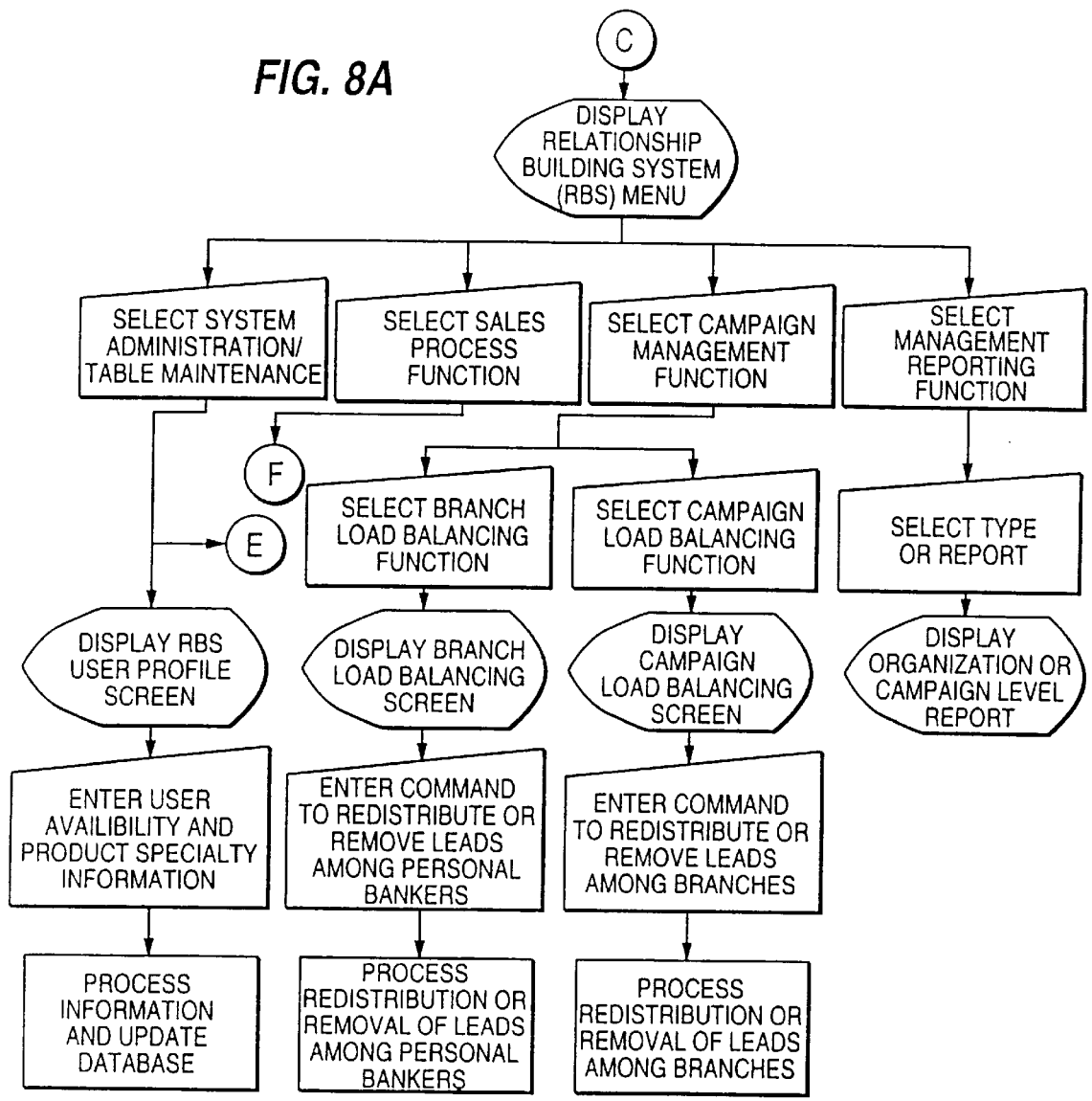
FIGS. 8A–8C are flow charts showing process steps for a relationship building system using the central customer information system.

Referring to FIG. 8A, the lead management system provides a means for selecting a number of functions from the main menu. Branch managers can use a user profile feature of the system administration/table maintenance function to define personal banker availability and product specialties. This function allows branch managers to communicate to the system user availability and product specialty information. This information is then used to determine: which personal bankers are accepting new leads and which are on vacation, involved in a special project, etc.; which personal bankers are accepting leads in multiple locations; and product specialties that should be used in assigning leads, such as mortgages, investments, etc.

Figure 8B:
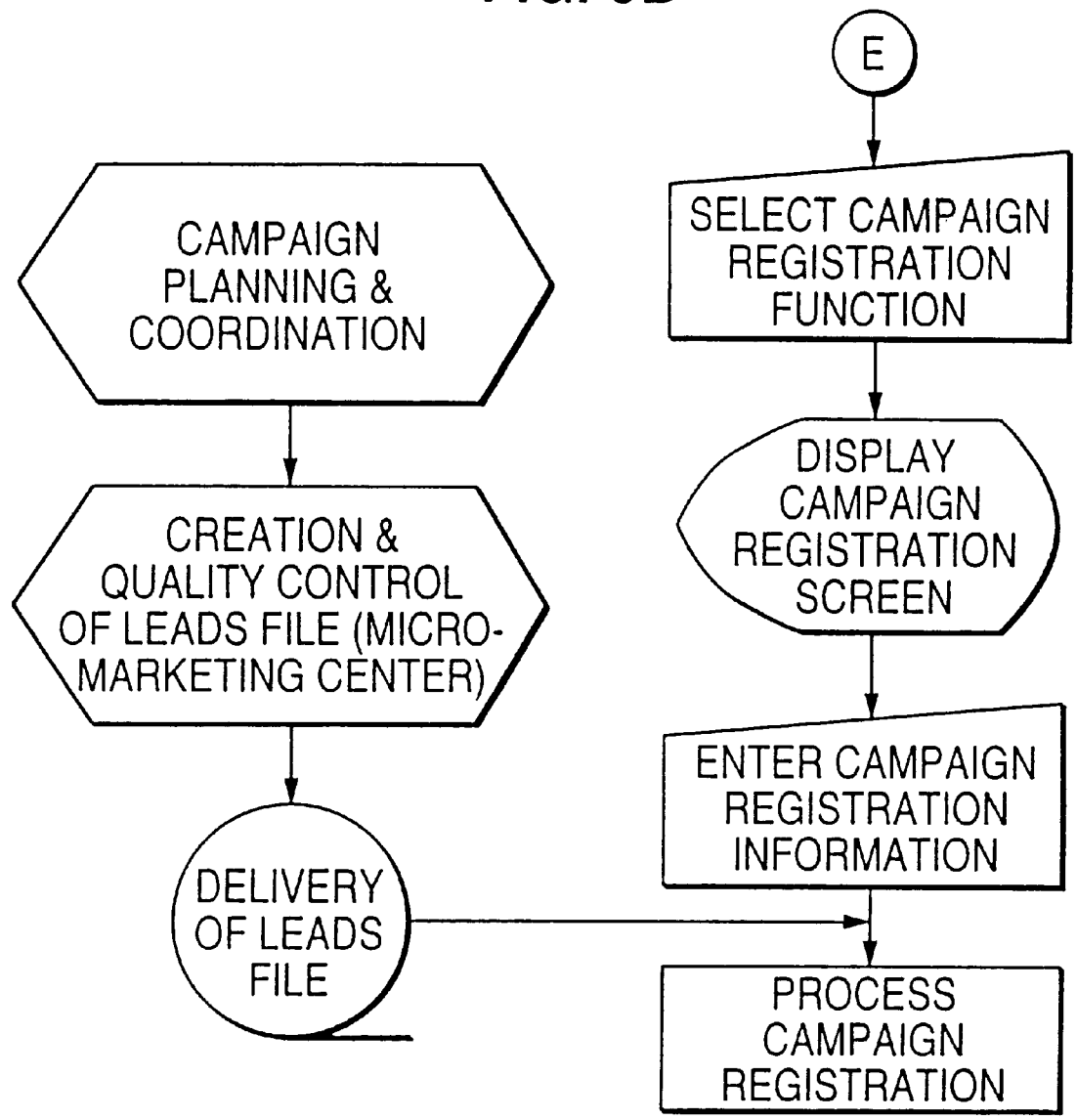

Referring to FIG. 8B, the lead management system also provides a campaign registration function for setting up new marketing campaigns. The campaign registration function is preferably done centrally by the management of the CCIS 13 coordinating with the management of the micromarketing center 11. However, sales leads can also be manually input by the personal bankers and branch managers. Both customer and non-customer leads can be individually ranked and added to campaigns while the campaign is in progress using the campaign registration function.

Leads are created according to management priorities. The campaign registration process has three parts. First, the campaign must be planned and coordinated. This also includes prioritizing the leads by the organization that will work the leads. Second, the file of leads must be created, quality controlled, and delivered to the CCIS 13. Third, the campaign must be registered on the campaign registration screen.

The campaign registration screen captures information used to distribute leads and execute the campaign. The information entered into the campaign registration screen preferably includes: a description of the campaign that includes the coordinator's name and address and explains the purpose of the campaign and any qualifying factors; a ranking for the campaign among all campaigns; whether referral leads may be added to the campaign; whether new leads should be appended or whether the campaign should be rebuilt when refreshed; milestones such as start and expiration dates, retention periods, and purge date; how to rank leads within the campaign (e.g., by balances, footings, profitability, or special priority order); and on what basis to select the branch to work the leads (e.g., where the account is domiciled, where the customer does most transactions, mailing address, etc.).

The leads are then distributed to personal bankers based on preset priorities. The lead management system honors existing personal banker relationships. A lead for a customer or household enrolled in an account management program is automatically assigned to the personal banker managing that relationship.

The lead management system has calendar functions, automatic lead transfer functions, a facility where additional customer and non-customer leads can be added, and automatic activity tracking capabilities. Also, users may "toggle" to other screens in the lead management system or customer profile system via jump keys in order to view customer information or perform other functions.

Figure 8C:
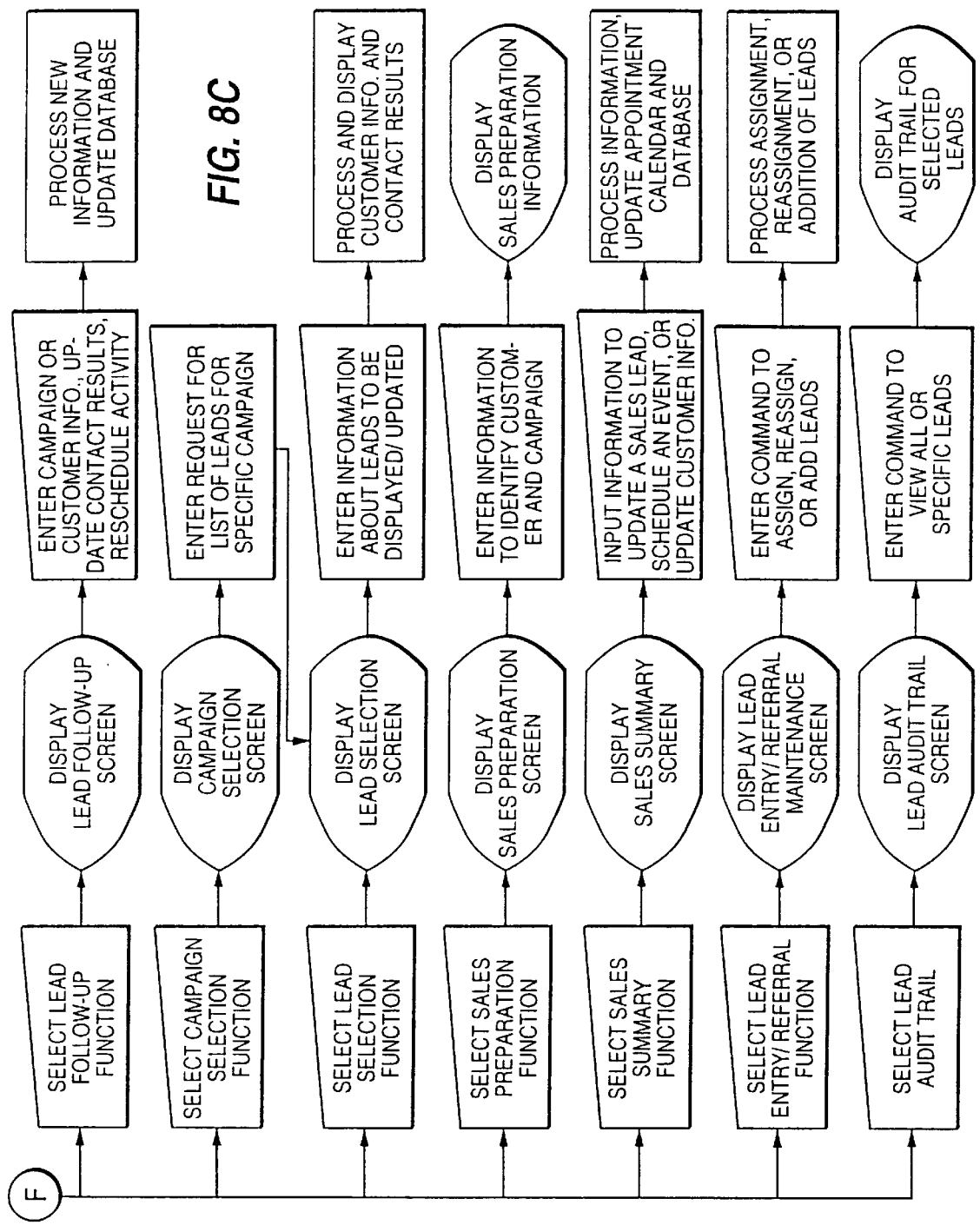

Referring to FIG. 8C, the sales process function of the lead management system will be explained in further detail. The sales process function provides a number of features, including lead follow-up, campaign selection, lead selection, sales preparation, sales summary, lead entry/referral, and lead audit trail.

The lead follow-up feature, when selected by the user, displays all scheduled appointments and events by date and time. Appointments can be made for main follow-ups, phone calls, or face to face meetings. The user can use this feature to view information about the campaign or customer such as contact history, customer notes and sales prompts, to update customer information and contact results, refer the customer to another sales person, or to reschedule the planned activity.

The campaign selection feature, when selected by the user, lists all campaigns assigned to the branch and/or personal banker with the number of leads and the lead status for each campaign.

The lead selection feature, when selected by the user, displays leads based on how the display was requested. The leads can be displayed in either rank or alphabetical order. From this screen, the user can view campaign or customer notes, view product and balance information, view contact history, view prompts, update customer information and contact results or schedule a follow-up activity, or update customer contact information and refer the customer to another sales person.

The sales preparation feature, when selected by the user, displays all of the campaigns for the customer, customer contact information such as name/address, phone, best time to call, suppression information, and a history of prior contacts. This feature also provides sales preparation prompts and notes that originate from other sources within the system. For example, customer prompts and notes come from customer information in the relationship profile component. Campaign prompts originate in the campaign registration function, and campaign notes are entered by the person working the lead on an "endless" note pad. Campaign prompts and notes stay with the lead.

The sales summary feature, when selected, is used to capture the outcome of each sales contact or sales attempt. The system will present the appropriate screen for entering information for closing a sales lead, maintaining a sales lead in progress, scheduling the next event for this lead, updating customer information, or entering customer notes.

The sales summary feature feeds information to the appointment calendar (the lead follow-up screen). If a date is input, the appointment calendar will be updated and the event will be scheduled. The sales summary screen will also feed information to the various facilities that summarize lead inventories, such as call attempts, and provide various campaign statistics for use by management.

The lead entry/referral feature, when selected by the user, is used to assign or reassign customer and non-customer leads to a campaign and to a specific branch and/or personal banker. The lead entry/referral screen can also be used to capture new leads or to capture information on referrals so that the lead can be added to a campaign or transferred to another personal banker.

Leads, which are always assigned to a specific campaign, can refer to existing customers or to non-customers. Leads can come from walk-in business, customers who attended a seminar, referrals from current customers, and so forth.

The lead audit trail feature, when selected by the user, informs the personal bankers whether anyone else has worked their assigned leads. The lead audit trail screen displays leads that have been worked by others or that have been transferred into or out of a personal banker's inventory. Branch managers can audit all personal bankers in their branch using the lead audit trail feature.

The campaign selection management function is used to balance campaign loads among personal bankers and branches. The branch load balancing screen shows how the leads for each campaign are distributed to the personal bankers in the branch and indicates "new" leads versus those "in progress." This screen allows leads to be moved from one personal banker to another, from one personal banker and redistributed evenly to all personal bankers in the branch based upon work load, or removed altogether and dropped from the campaign.

The campaign load balancing screen is similar to the branch load balancing screen, but shows how the leads for each campaign are distributed among the branches, rather than among the personal bankers. This screen allows leads to be moved from one branch and assigned to another branch, moved from one branch and redistributed evenly to all branches based upon work loads, or removed altogether and dropped from the campaign.

The management reporting function displays or prints organization or campaign level reports showing the status of leads in each campaign. This reporting function also displays a listing of all branches within an area or bank for one specific campaign, and a listing of all campaigns for each specific organizational level.

Sales Tracking and Reporting Component

The sales tracking and reporting component provides daily on-line sales summary reports on products and services for organizations from bank and area to branch and personal banker. The sales tracking and reporting component utilizes the central database 10 to analyze and report sales transactions for each personal banker or other customer service representative.

Sales transactions are stored on the central database 10 for a predetermined time after entry into the CCIS 13 (e.g., twenty-four months), are captured directly from actual bookings during the sales sessions, and are available in real time as soon as the sales transactions are transmitted to the central database 10. The sales tracking and reporting component includes a sales summary stored in the central database 10 that is updated daily, so that up-to-date sales information is available at the start of each business day.

Figure 9A:
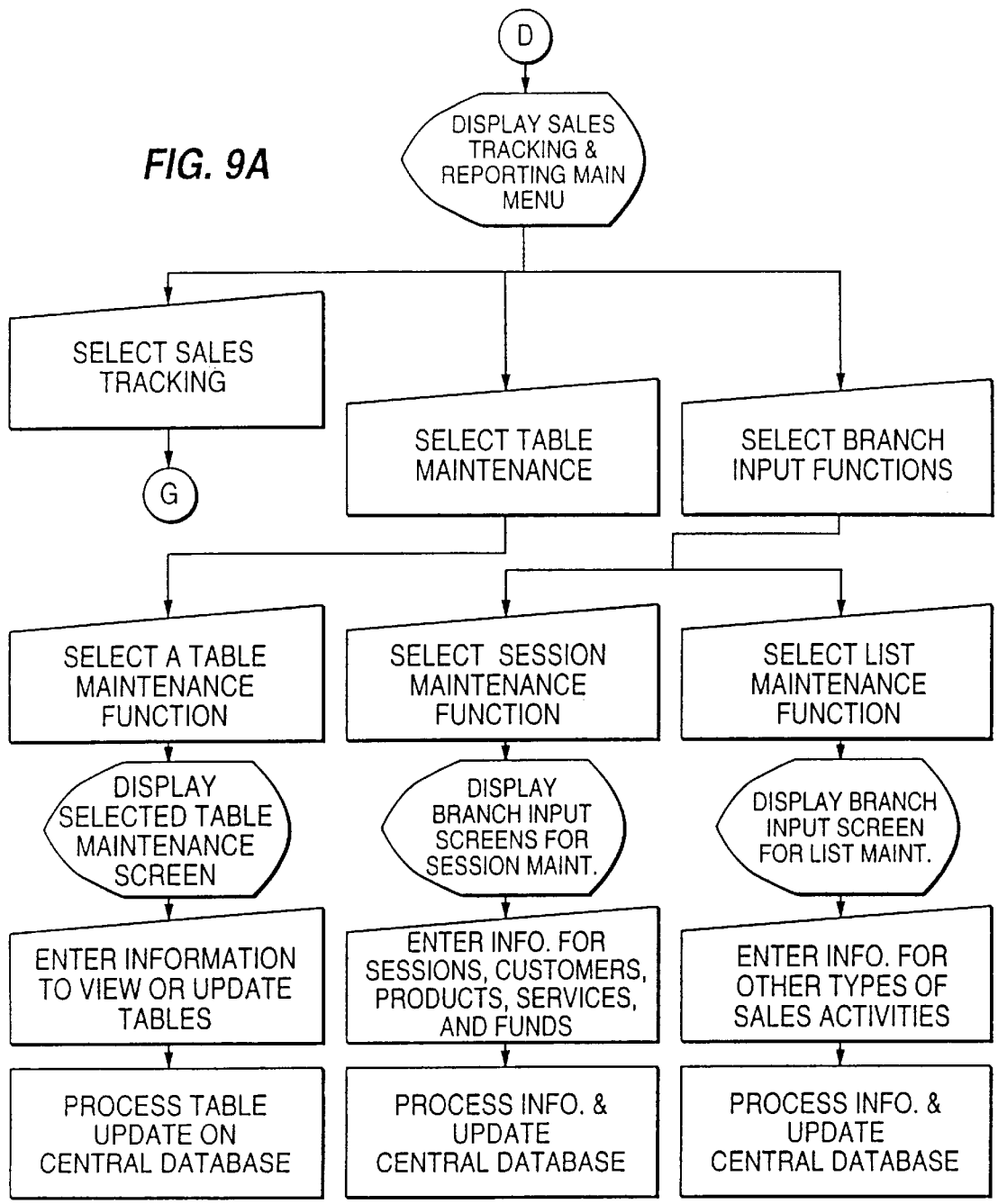

Referring to FIG. 9A, the sales tracking and reporting component includes three functional sections: "sales tracking" for creating reports; "table maintenance" for viewing or updating tables; and "branch input" functions for adding sessions, correcting sessions, and inputting information for other types of sales activities.

As shown in FIG. 9B, the sales tracking function includes several preformatted reports for displaying detailed sales information using information stored in the central database 10. A sales performance report shows sales by number of accounts and by new and existing dollars in liability, asset, and investment products. This report also provides consolidated reports for lists of branches and personal bankers.

A services report shows sales of such banking services as direct access, enhanced telephone, and checks as cash. A cross-sell performance report shows the number of products sold per session to new and existing customers. A source of funds report shows whether accounts are being funded from other competing banks, investment companies, and specific types of accounts. A source of customers report shows campaign and advertising impacts. A branch activities report shows branch activities entered through the sales tracking and reporting component. A performance versus goals report indicates whether a particular branch or personal banker is meeting the goals set by the campaign management.

Referring again to FIG. 9A, the session and list maintenance functions of the sales tracking and reporting component provide several branch input screens. Based upon the user's security profile, the user can use the branch input screens to add, delete, or edit information about whole sessions, customers, products, services, funds, or other types of sales activities. The input information is then processed and updated on the central database 10 and is available for review using the sales tracking and reporting function.

The sales tracking and reporting component preferably is used to provide objective indicators to drive employee compensation. For example, the sales tracking component provides an indication of the amount of revenue generated for the financial institution by each personal banker and branch manager. This, in turn, provides a direct indication of the value of the personal banker or branch manager to the financial institution. The client server technology of the sales tracking provides fast, time-stamped data extracts from the customer database.

Customer Scoring and Contact Strategies

A comprehensive, customized lifetime value (LTV) score is determined for each customer using the information contained on the central database 10. The LTV score is calculated based upon the total profits contributed by the customer over the entire spectrum of products and services used by the customer. The profits from all of the products and services are grouped together to provide an indication of the total value of the customer to the bank. The LTV score is then converted into a selectable feature on each customer record, so marketing and servicing programs can be designed around lifetime values. For example, a campaign for certain bank products or services could be limited to customers with a lifetime value exceeding a predetermined amount.

In addition, a dynamic, updated customer net revenue score is generated for indicating the current value of the individual profitability of the customer. This score can be used to compare business financials, to select candidates for marketing/branch programs, and to identify prime or marginal customer contributions.

A number of contact strategy models are preferably used in the present invention to identify and target sales leads that are the best candidates for each sales campaign. These models are based on the customers' propensity to behave in certain ways. For example, customers meeting certain criteria, such as owning a home, having kids, financing college education and having low deposits or investments, have a higher likelihood of using credit products. The contact strategy models allow targeted leads to be generated in the micromarketing center 11 that increase the success rate for customer contacts by sales personnel using the CCIS 13.

A name/address standardization component provides a systematic approach to selecting "prime" names and addresses from among possible customer names and addresses in the database, and standardizing them to make the most mailable names and addresses. By standardizing the names and addresses, it is possible to enhance list generation from an end-user's desktop.

A distance from branch component provides a customized systems method of choosing the three branch locations nearest to a given address, taking into account geographical features like rivers, and so forth. This feature enables the three banks or branches nearest the address to use targeted marketing programs utilizing radius marketing techniques.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

We claim:

1. An electronic sales and service support system for a financial institution, comprising:

a central database containing information about households, customers, and accounts serviced by said financial institution wherein the central database stores the information about households, customers and accounts in a hierarchy such that the household information is a level above the customer information and the customer information is a level above the account information;

a micromarketing center having at least one user workstation in electronic communication with said central database, said user workstation having an input device for entering selection criteria which operates individually or on combinations of household, customer and/or account information copied from the central database for defining a selected group of customers to target for a marketing campaign; and a central customer information system having a plurality of branch workstations in electronic communication with said micromarketing center and said central database, said branch workstations each having a display device for selectively displaying a profile of a customer including the customer's relationship with the financial institution; and whereby said micromarketing center generates a list of customers from the selected group of customers to target for a marketing campaign and electronically communicates the list of customers to the central customer information system, wherein the list communicated to the central customer information system contains customer identification information and customer summary information, and said central customer information system selectively provides information about said list of customers in real time, directly from the central database via a telecommunication link, when said list of customers are contacted during a marketing campaign.

2. The electronic sales and service support system of claim 1, wherein said central database comprises:

a central data storage means for storing the central database;

means for inputting input data into the central data storage means from a plurality of sources; and means for standardizing and householding the input data in the central data storage into the hierarchy.

3. The electronic sales and service support system of claim 2, further comprising means for searching the data storage means in response to structured queries and identifying records that match said queries; and means for building said structured queries in response to a user's selection of criteria from a graphic user interface of the user workstation at said micromarketing center.

4. The electronic sales and service support system of claim 3, wherein said user workstation at said micromarketing center includes means for retrieving identified data records from the central data storage means in response to said structured queries and remote data storage means for storing data records retrieved from the central data storage means.

5. The electronic sales and service support system of claim 4, wherein said user workstation of said micromarketing center comprises means for displaying data records retrieved from the central data storage means in response to said structured queries.

6. The electronic sales and service support system of claim 1, further including means for transmitting data records from the user workstation at the micromarketing center to the plurality of branch workstations of the central customer information system.

7. The electronic sales and service support system of claim 1, further comprising means for generating logical access paths for searching the central data storage means and quickly identifying records that match said queries.

8. A method of identifying sales targets, distributing sales leads, and enhancing sales tools for a marketing campaign, comprising the steps of:

inputting data into a central database from a plurality of sources;

standardizing and householding said input data into a plurality of organizational levels within said central database wherein said organization levels include household level information, customer level information and account level information where the household level information is a level above the customer level information and the customer level information is a level above the account level information;

placing a user workstation in a micromarketing center in electronic communication with said central database;

entering criteria into a user interface of said user workstation for defining a list of customers to target during a sales campaign, wherein the list of customers contains customer identification information and customer summary information;

building structured queries in response to the selected criteria which operates individually or on combinations of household level information, customer level information and/or account level information;

searching the central database using said structured queries, identifying records in said central database that match said selected criteria, and generating said first list of customers to target during the sales campaign;

placing a branch workstation of a central customer information system in electronic communication with said central database;

distributing said list of customers to said branch workstation; and displaying a profile containing information about a customer from said list of customers on said branch workstation during a sales session with said customer during the sales campaign wherein the branch workstation receives the profile directly from the central database.

9. The method of claim 8, further comprising the steps of:

householding said information within said central database into household, customer, and account levels; and generating a logical data access path for accessing data in each of the levels.

10. A system for storage, searching, and retrieval of financial and demographic data, comprising:

a central data storage means;

means for inputting data into the central data storage means from a plurality of sources;

means for standardizing input data in the central data storage means in a plurality of organizational levels wherein a first organizational level is above a second organizational level;

a plurality of user workstations that are remote from the central data storage means, each of the user workstations including data storage means and display means, the workstations including means for generating a graphic user interface for allowing a user to select search criteria blocks to graphically build a graphically constructed search query;

means for converting the graphically constructed search query into a text query that includes necessary codes and syntax required to insure that the text query will run;

means for allowing data communication between the user workstations and the central data storage means;

means for searching the central data storage means in response to structured queries received from one of the user workstations and identifying records that match said queries;

means for providing specific leads comprised of customer identification information and customer summary information to the user workstation; and means for directly downloading the specific leads to a branch workstation wherein the branch workstation receives a customer profile directly from the central data storage via a telecommunication link.

11. The system of claim 10, wherein said user workstation includes means for retrieving identified data records from the central data storage means in response to said structured queries and means for downloading reports and files to local printers and storage devices.

12. The system of claim 11, wherein said graphic user interface includes pull-down windows, icons, and drag-and-drop operation.

13. The system of claim 10, further comprising a plurality of branch workstations connected to each user workstation by telecommunication means, and means for transmitting data records from the user workstation to the plurality of branch workstations.

14. The system of claim 10, further comprising means for generating logical access paths for searching the central data storage means and identifying records that match said queries.

15. The system of claim 14, wherein said first organizational level comprises household level information, said second organizational level comprises customer level information, and said plurality of organization levels comprise a third organization level that comprises account level information, and further comprising means for defining a universe of selected households, customers, and accounts for each query.

16. The system of claim 15, further comprising means for defining criteria of households or customers within said defined universe for generating a list of optimum sales leads for a marketing campaign.

17. The system of claim 10, further comprising means for grouping data records into a single unit considered to be one household, based on demographic information.

18. The system of claim 10, wherein the customer service database is remote from the central database.

19. The system of claim 10, wherein the central database includes a security database component, a domain database component, a parameter database component, a generation database component, a query output database component, a selected query universe component, and a household-customer-account repository component, and wherein the components of the central database are interfaced with each other and with the outside communication feeds by a database engine.

20. The system of claim 19, wherein the database engine includes a first logical component that extracts specified keys that satisfy the user criteria; and a second logical component that picks up all the data items that the user wants;

wherein both the first and second logical components can be saved for further processing at another time; and further comprising means for using the saved keys to pick up a different set of fields.

* * * * *